(12) United States Patent
Khan et al.

(10) Patent No.: US 10,795,742 B1
(45) Date of Patent: Oct. 6, 2020

(54) ISOLATING UNRESPONSIVE CUSTOMER LOGIC FROM A BUS

(71) Applicant: Amazon Technologies, Inc., Seattle, WA (US)

(72) Inventors: Asif Khan, Cedar Park, TX (US); Sundeep Amirineni, Austin, TX (US); Kiran Kalkunte Seshadri, Cedar Park, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 15/638,080

(22) Filed: Jun. 29, 2017

Related U.S. Application Data

(63) Continuation-in-part of application No. 15/279,232, filed on Sep. 28, 2016, now Pat. No. 10,223,317.

(60) Provisional application No. 62/486,901, filed on Apr. 18, 2017.

(51) Int. Cl.
  *G06F 11/07* (2006.01)
  *H04L 12/24* (2006.01)
  *H04L 12/26* (2006.01)
  *G06F 16/635* (2019.01)
  (Continued)

(52) U.S. Cl.
  CPC ........ *G06F 11/0709* (2013.01); *G06F 11/301* (2013.01); *G06F 11/3031* (2013.01); *G06F 11/3051* (2013.01); *G06F 11/3058* (2013.01); *G06F 11/3089* (2013.01); *G06F 16/637* (2019.01); *H04L 41/065* (2013.01); *H04L 41/0659* (2013.01); *H04L 43/0823* (2013.01); *G06F 15/16* (2013.01)

(58) Field of Classification Search
  CPC ............... G06F 11/301; G06F 11/3031; G06F 11/3051; G06F 11/3058; G06F 11/3089; G06F 11/0709; G06F 16/637; G06F 15/16; H04L 41/065; H04L 41/0659; H04L 43/0823
  See application file for complete search history.

(56) References Cited

U.S. PATENT DOCUMENTS

| | | | |
|---|---|---|---|
| 6,530,049 B1 * | 3/2003 | Abramovici ... | G01R 31/318519 714/725 |
| 6,668,237 B1 | 12/2003 | Guccione et al. | |

(Continued)

FOREIGN PATENT DOCUMENTS

| | | |
|---|---|---|
| CN | 103477561 | 12/2013 |
| CN | 104583986 | 4/2015 |

(Continued)

OTHER PUBLICATIONS

U.S. Appl. No. 15/279,232, filed Sep. 28, 2016, Titled: Configurable Logic Platform.

(Continued)

*Primary Examiner* — Paul Contino
(74) *Attorney, Agent, or Firm* — Kilpatrick Townsend & Stockton LLP

(57) ABSTRACT

Disclosed are techniques regarding aspects of implementing client configurable logic within a computer system. The computer system can be a cloud infrastructure. The techniques can include determining that the client configurable logic has performed an errant action.

22 Claims, 10 Drawing Sheets

(51) Int. Cl.
*G06F 11/30* (2006.01)
*G06F 15/16* (2006.01)

(56) References Cited

U.S. PATENT DOCUMENTS

| | | | |
|---|---|---|---|
| 6,966,020 B1* | 11/2005 | Abramovici | G01R 31/31851 714/725 |
| 7,203,842 B2 | 4/2007 | Kean | |
| 7,275,163 B2 | 9/2007 | Cocchi et al. | |
| 7,315,897 B1 | 1/2008 | Hardee et al. | |
| 7,555,617 B2 | 6/2009 | Timmermans et al. | |
| 7,739,520 B2 | 6/2010 | Horvat et al. | |
| 7,795,901 B1* | 9/2010 | Yang | H03K 19/17764 326/16 |
| 8,316,439 B2* | 11/2012 | Fang | G06F 21/554 709/227 |
| 8,554,953 B1* | 10/2013 | Sorensen | A61B 7/04 710/2 |
| 8,561,183 B2 | 10/2013 | Muth et al. | |
| 8,595,832 B1 | 11/2013 | Yee et al. | |
| 8,850,574 B1 | 9/2014 | Ansel et al. | |
| 9,170,911 B1* | 10/2015 | Atsatt | G06F 11/0724 |
| 9,503,093 B2* | 11/2016 | Karras | G06F 17/5068 |
| 9,589,088 B1 | 3/2017 | Mishra et al. | |
| 9,690,600 B2 | 6/2017 | Jung et al. | |
| 10,048,977 B2* | 8/2018 | Palermo | G06F 9/45558 |
| 10,133,594 B1 | 11/2018 | Zhang et al. | |
| 10,223,317 B2* | 3/2019 | Atta | G06F 13/4068 |
| 10,423,438 B2* | 9/2019 | Atta | G06F 15/76 |
| 2002/0194548 A1* | 12/2002 | Tetreault | G06F 11/0745 714/43 |
| 2003/0208606 A1* | 11/2003 | Maguire | G06F 21/554 709/227 |
| 2005/0251040 A1* | 11/2005 | Relkuntwar | H04L 67/12 600/437 |
| 2007/0220367 A1* | 9/2007 | Smith | G06F 11/181 714/48 |
| 2007/0283311 A1 | 12/2007 | Karoubalis et al. | |
| 2008/0046997 A1 | 2/2008 | Wang | |
| 2008/0082881 A1* | 4/2008 | Szydlowski | G06F 11/24 714/731 |
| 2009/0132821 A1 | 5/2009 | Matsuzaki | |
| 2009/0282477 A1 | 11/2009 | Chen et al. | |
| 2012/0005473 A1 | 1/2012 | Hofstee et al. | |
| 2013/0265067 A1* | 10/2013 | Leedy | G01R 31/2894 324/750.01 |
| 2014/0181491 A1 | 6/2014 | Kakolaki et al. | |
| 2014/0215424 A1* | 7/2014 | Fine | G06F 17/5054 716/117 |
| 2014/0297405 A1* | 10/2014 | Fine | G06F 11/3419 705/14.53 |
| 2015/0100772 A1 | 4/2015 | Jung et al. | |
| 2015/0121060 A1 | 4/2015 | Mimms et al. | |
| 2015/0150118 A1* | 5/2015 | Addepalli | G06F 12/145 726/17 |
| 2015/0193515 A1 | 7/2015 | Thyagarajan et al. | |
| 2015/0278041 A1* | 10/2015 | Ganesan | G06F 11/1484 714/4.11 |
| 2016/0034404 A1 | 2/2016 | Doster et al. | |
| 2016/0139811 A1* | 5/2016 | Ikeuchi | H03K 19/17752 711/170 |
| 2016/0313370 A1* | 10/2016 | Neeb | G01R 1/025 |
| 2016/0321113 A1* | 11/2016 | Pinto | G06F 9/45533 |
| 2016/0380635 A1* | 12/2016 | Roberts | H03K 19/0008 326/38 |
| 2017/0024573 A1 | 1/2017 | Bhattacharyya et al. | |
| 2017/0031699 A1* | 2/2017 | Banerjee | G06F 9/45558 |
| 2017/0339234 A1* | 11/2017 | Vajravel | H04L 67/141 |
| 2018/0088174 A1 | 3/2018 | Davis et al. | |
| 2018/0088992 A1 | 3/2018 | Davis et al. | |
| 2018/0089119 A1 | 3/2018 | Khan et al. | |
| 2018/0089343 A1 | 3/2018 | Atta | |
| 2018/0091484 A1 | 3/2018 | Atta et al. | |
| 2018/0095670 A1 | 4/2018 | Davis et al. | |
| 2018/0139110 A1 | 5/2018 | Johnson et al. | |

FOREIGN PATENT DOCUMENTS

| | | |
|---|---|---|
| JP | 2005157974 | 6/2005 |
| JP | 2008523727 | 7/2008 |
| WO | 0209285 | 1/2002 |
| WO | 2012040691 | 3/2012 |

OTHER PUBLICATIONS

Byma et al., "FPGAs in the Cloud: Booting Virtualized Hardware Accelerators with OpenStack," 2014 IEEE[22nd] Annual International Symposium on Programmable Custom Computing Machines (May 2014), pp. 109-116.

SDAccel Development Environment User Guide. [online]. XILINX Inc., Feb. 16, 2016 [retrieved on Sep. 28, 2017]. Retrieved from the Internet: <URL: https://www.xilinx.com/support/documentation/sw_manuals/xilinx2015_4/ug1023-sdaccel-user-guide.pdf>, 85 pages.

The XILINX SDAccel Development Environment. [online]. XILINX Inc., 2014 [retrieved on Sep. 28, 2017]. Retrieved from the Internet: <URL: https://www.xilinx.com/publications/prod_mktg/sdx/sdaccel-backgrounder.pdf>, 6 pages.

Kwok et al., "High Performance Embedded Reconfigurable Computing: Data Security and Media Processing Applications", Thesis (M. Phil.)—University of Hong Kong, Available online at http://hub.hku.hk/handle/10722/26680, Oct. 10, 2005.

"Design of a Secure Control Plane Bridge", Microsemi, 2013, pp. 1-11.

"Introduction to Implementing Design Security with Microsemi SmartFusion2 and IGL002 FPGAs", Microsemi, Nov. 2013, pp. 1-13.

U.S. Appl. No. 15/279,232 , "Non Final Office Action", dated Apr. 27, 2018, 33 pages.

Shin et al., "Avant-Guard: Scalable and Vigilant Switch Flow Management in Software-Defined Networks", ACM Digital Library http://dx.doi.org/10.1145/2508859.2516684, 2013, pp. 413-424.

Unnikrishnan et al., "ReClick—A Modular Dataplane Design Framework for FPGA-Based Network Virtualization", Seventh ACM/IEEE Symposium of Architectures for Networking and Communications Systems, 2011, 11 pages.

PCT/US2017/053599 , "International Search Report and Written Opinion", dated Jan. 5, 2018, 12 pages.

U.S. Appl. No. 15/279,232 , "Notice of Allowance", dated Nov. 1, 2018, 9 pages.

PCT/US2017/053599 , "International Preliminary Report on Patentability", dated Apr. 11, 2019, 11 pages.

CN201780059743.8 , "Office Action", dated Oct. 9, 2019, 19 pages.
JP2019-516662 , "Office Action", dated Oct. 11, 2019, 5 pages.
EP17783643.4 , "Office Action", dated Mar. 16, 2020, 12 pages.
Application No. CN201780059743.8 , Office Action, dated May 22, 2020, 12 pages.
Application No. JP2019-516662 , Notice of Decision to Grant, dated Jun. 26, 2020, 6 pages.

* cited by examiner

ISOLATING UNRESPONSIVE CUSTOMER LOGIC FROM A BUS

CROSS-REFERENCE TO RELATED APPLICATIONS

This application claims priority to U.S. Provisional Application No. 62/486,901, filed Apr. 18, 2017, titled "ISOLATING UNRESPONSIVE CUSTOMER LOGIC FROM A BUS", and is a Continuation-in-Part of U.S. application Ser. No. 15/279,232, filed Sep. 28, 2016, issued as U.S. Pat. No. 10,223,317 on Mar. 5, 2019, and titled "CONFIGURABLE LOGIC PLATFORM", the disclosures of which are incorporated by reference herein in their entirety for all purposes.

BACKGROUND

Cloud computing techniques can include use of networked computing resources of a cloud infrastructure to be made available for use by clients of a cloud services provider. Clients can access the networked computing resources via a network, such as the internet, to configure the networked computing resources to provide a service or to access a service by another client. Cloud service providers may receive monetary compensation from clients in exchange for access to or use of the networked computing resources. Cloud computing techniques can facilitate more efficient use of networked computing resources by, for example, enabling the resources to be allocated as needed between clients (e.g., for clients to scale services operating on cloud computing resources or to prototype new cloud enabled services) and/or by allocating hardware sequentially to service several clients.

Clients of cloud services may have diverse computing requirements resulting from different use cases. A cloud service provider can include various computer systems having different types of components with varying levels of performance and/or functionality. Thus, a client can select a computer system that is potentially more efficient at executing a particular task. For example, the cloud service provider can provide systems with varying combinations of processing performance, memory performance, storage capacity or performance, and networking capacity or performance. However, some clients may desire to use hardware that is proprietary or highly specialized for executing their computing tasks. Enabling use of client defined hardware (e.g., hardware over which a client has a relatively detailed level of control) within a cloud infrastructure can raise security and/or stability integrity concerns.

BRIEF DESCRIPTION OF THE DRAWINGS

Various embodiments in accordance with the present disclosure will be described with reference to the drawings, in which.

DETAILED DESCRIPTION

Figure 1:
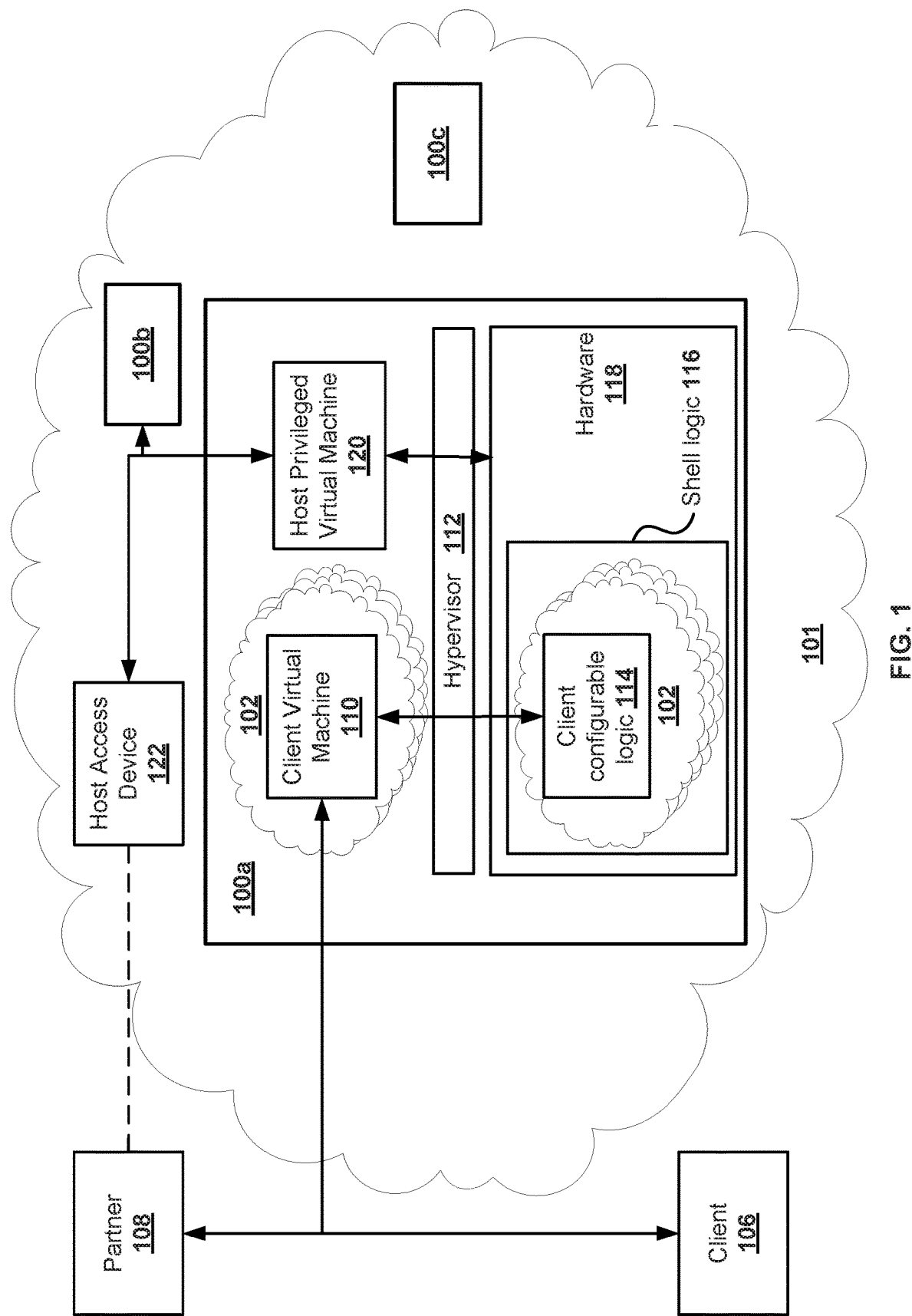
FIG. 1 illustrates a cloud computing system and corresponding domains according to certain embodiments.

Cloud service providers can utilize virtualization techniques which can include physically or logically isolating host services to a host domain and client services to client domains. A domain refers to, for example, a group of logical computer devices and/or hardware computers and devices on a network that are administered as a unit with common rules and procedures. By isolating a client domain from a host domain, a client may be able to access certain functionality provided by a cloud service and may be restricted from accessing functionality of the host domain. For example, host domain functionality can include management of the cloud infrastructure which, if accessed by a client system, could jeopardize functionality of the cloud system. Furthermore, logical domain separation allows various platforms and services to be abstracted from the underlying hardware, providing flexibility within a cloud infrastructure to service a multitude of varied and differing client requirements and more efficiently assign the underlying hardware and other computer resources between client domains. A certain amount of overhead may be introduced to facilitate logical separation of different domains. This overhead may take the form of reduced performance of client services and/or client access to services. Certain clients may desire to have specialized computing resources (e.g., hardware computing resources) that may enable more efficient processing of certain client functions. Disclosed are techniques that can be used to enable use of specialized hardware computing resources within a cloud environment while still providing separation between a host domain and a client domain on which the specialized hardware computing resources may reside.

A cloud infrastructure can include a variety of computer resources, where one type of the computer resources can include a computer device comprising a client configurable logic circuit. The client configurable logic circuit can be programmed or configured by a client of the cloud infrastructure so that hardware (e.g., the configurable logic) of the computing resource is customized by the client. For example, the client can program the configurable logic so that it functions as a hardware accelerator that is tightly coupled to the computer device. As a specific example, the hardware accelerator can be accessible via a local interconnect, such as Peripheral Component Interconnect Express (PCI-Express or PCIe), of the computer device. The client can execute an application on the computer device and tasks of the application can be performed by the hardware accelerator using PCIe commands. By tightly coupling the hardware accelerator to the computer device, the latency between the accelerator and the computer device can be reduced which can potentially increase the processing speed of the application.

A cloud service provider can potentially increase the security and/or availability of the computing resources by wrapping or encapsulating the user's configurable logic (also referred to herein as application logic) within shell logic. Encapsulating the configurable logic can include limiting or restricting the configurable logic's access to configuration resources, hardware interfaces, hard macros of the client configurable logic circuit, and various peripherals of the client configurable logic circuit. The shell logic can provide a framework or sandbox for the configurable logic to work within. In particular, the shell logic can communicate with the configurable logic and constrain the functionality of the configurable logic. For example, the shell logic can perform bridging functions between the local interconnect (e.g., the PCIe interconnect) and the configurable logic so that the configurable logic cannot directly control the signaling on the local interconnect. The shell logic can be responsible for forming packets or bus commands on the local interconnect and ensuring that the protocol requirements are met. By controlling commands on the local interconnect, the shell logic can potentially prevent malformed commands or commands to out-of-bounds locations.

A solution for providing specialized hardware computing resources in a cloud environment is to provide a networked computing resource including a client configurable logic circuit. The client configurable logic circuit can be included within an add-in card to a networked computer device and may include configurable logic, such as a field-programmable gate array (FPGA). Configurable logic is hardware that can be programmed or configured to perform a logic function. Configurations of the configurable logic can be specified according to configuration data that is applied to or loaded by the configurable logic. For example, a user of the computing resources can provide a specification (such as source code written in a hardware description language) for configuring the configurable logic, the configurable logic can be configured according to the specification, and the configured logic can thereafter be used to perform a task for the user.

However, allowing a client of a cloud service access to low-level hardware of a cloud computer device can potentially introduce security and privacy issues within the cloud infrastructure. As a specific example, a faulty or malicious design from one client could potentially cause a denial of service to other users if the configured logic causes one or more devices within the cloud infrastructure to malfunction (e.g., crash, hang, or reboot) or be denied infrastructure resources. As another specific example, a faulty or malicious design from one user could potentially corrupt or read data from another client if the configured logic is able to read and/or write memory of the other client's memory space.

Disclosed techniques can include use of a monitoring circuit that can be coupled to or included with the aforementioned shell logic. The monitoring circuit can be used to monitor data transferred to or from a client configuration of configurable logic. By monitoring the data, a determination can be made if the client configuration of the configurable logic or a client machine coupled to the client configuration has performed an errant action (e.g., accessing memory space outside of its domain, overloading hardware components or data buses, etc.). In response to determining that that an errant action corresponding to the configuration has occurred, a corrective action can be performed. For example, the configurable logic or a client machine coupled to the configurable logic can be isolated or overwritten. By coupling the monitoring circuit to the shell logic of client configurable hardware logic, a client of a cloud infrastructure may have relatively unfettered access within the client's domain including access to client configured configurable hardware logic while still providing safeguards against instabilities to a host computer system or environment including the configurable hardware logic.

FIG. 1 illustrates a simplified logical diagram of a host domain 101 of a cloud infrastructure system that may provide one or more cloud enabled services to a client 106 or a type of client referred to as a partner device 108. Host domain 101 can reside within a cloud infrastructure system. Computer devices 100a-100c and host access device 122 can each reside within the cloud infrastructure system. Computer devices 100a-100c and host access devices 122 can reside within host domain 101. Hypervisor 112, client virtual machine 110, host privileged virtual machine 120, and hardware 118 can reside within computer device 100a. Hypervisor 112 can provide separation between domains of the cloud infrastructure system by, for example, managing interactions between logical and/or physical devices across between domains. A hypervisor may be used to generate and/or manage logical components that can be implemented using hardware components of a cloud infrastructure system.

Partner device 108 may be a client of host domain 101 that is privileged to utilize cloud resources to provide a service. For example, partner device 108 can be used to request, via host access device 122, one or more resources of the cloud infrastructure system to enable a service. Client 106 may be a user of a service of partner device 108. Thus, partner device 108 may have more privileged access to cloud infrastructure system than client 106. The service can be enabled through use of one or more hardware components 118 of computer device 100a within host domain 101. The one or more hardware devices 118 can be logically abstracted, via hypervisor 112, into a client virtual machine 110 that client 106 or partner device 108 is privileged to access. Hypervisor 112 can manage client virtual machine 110 and other virtual machines that may operate within host domain 101 (such as host privileged virtual machine 120). Host privileged virtual machine 120 is a privileged type of virtual machine that may have direct access to hardware 118, drivers, or an operating system of computer device 100a. Hardware 118 can include processors, memory, fixed function hardware, peripherals, and/or client configurable logic 114. The operating system may manage/schedule interactions between logical virtual machines and physical components within host domain 101. Client virtual machine 110 can be one of several virtual machines operating within computer device 100a and can be logically separated from hardware devices of host domain 101 that services client virtual machine 110.

In certain embodiments, a computer device, such as computer device 100b may be a purely hardware device that is included within a client domain (such as client domain 102). A client, via client device 106, may access computer device 100b via a corresponding client domain. Thus, hardware device(s) may be configured for access by a client of a service provider/cloud infrastructure without use of logical/virtualization techniques by isolating access to the hardware device(s) to the client (while included within the client domain). An access control entity can limit access between components within a service-provider infrastructure (such as a cloud infrastructure network) in a spatial and/or time partitioned manner to enable each of client or users of the service provider network access to components within their respective domain while limiting access by other users. However, access may still be allowed for a device or user having a higher privilege level (e.g., a device or user within host domain 101). A hypervisor is an example of an access control entity that can manage access between logical and/or physical devices between domains.

The logical separation of client virtual machine 110 can be accomplished by logically isolating client virtual machine 110 into a client domain 102. Client domain 102 can be separated from a host domain 101 of a cloud infrastructure system. Hypervisor 112 may reside on the host domain 101 but have access to client domain 102 whereas virtual or physical devices of client domain 102 may be prevented from accessing virtual or physical devices of host domain 101 (or other client domains). Techniques disclosed herein can be used to create and manage client configurable logic 114 within the cloud infrastructure system. Client configurable logic 114 can include configurable hardware logic that can be used by partner device 108, for example, to implement and have access to a hardware device within the cloud infrastructure system.

Client configurable logic 114 can be configured to act as a hardware accelerator, for example. The hardware accelerator can be created using programmable logic device(s) such that multiple clients may be able to configure differing accelerators using a same underlying hardware device. As disclosed herein, client configurable logic 114 may reside within client domain 102. However, access between client virtual machine 110 and client configurable logic 114 may pass through a host domain 101 of a cloud infrastructure system so that the cloud infrastructure system can manage and monitor access to the underlying hardware components implementing client configurable logic 114.

Figure 2:
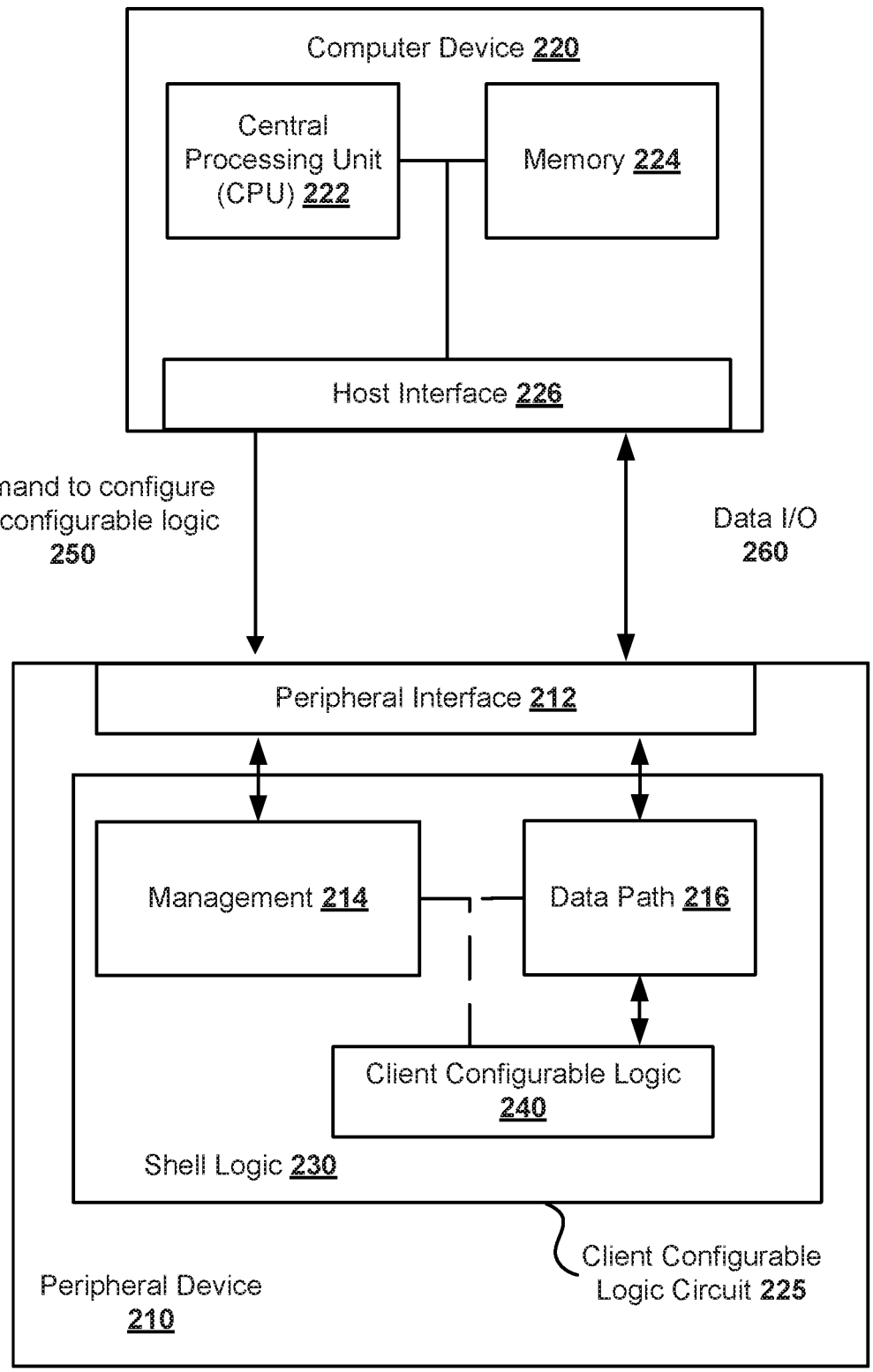
FIG. 2 illustrates a system diagram showing an example of a system including a client configurable logic circuit.

FIG. 2 is a system diagram showing an example of a computing system 200 including a peripheral device 210 and a computer device 220. System 200 can be used to implement client virtual machine 110 and/or client configurable logic 114 of FIG. 1. For example, client configurable logic 240 can be similar to client configurable logic 114 and client virtual machine 110 can be implemented within computer device 220. Computer device 220 can include a central processing unit (CPU) 222, memory 224, and a host interface 226. The CPU 222 can be used to execute instructions stored in the memory 224. For example, the memory 224 can be loaded with all or a portion of the cloud service and the CPU 222 can execute the instructions of the cloud service. The cloud service can communicate with a hardware accelerator of the peripheral device 210 by issuing commands using the host interface 226.

A command can be a read request, a write request, a read response, a message, an interrupt, or other various data transmittals. The command can occur on a bus shared by multiple components. Specifically, values of signal lines of the bus can be modulated to transfer data on the bus using a communications protocol of the bus. The command can occur over one or more phases, such as an address phase and one or more data phases. Additionally or alternatively, the command can occur using one or more serial lines of a point-to-point interconnect that connects two components. Specifically, the command can be sent in a packet that is transmitted over the point-to-point interconnect.

The host interface 226 can include a bridge for communicating between the CPU 222 using a local or front-side interconnect and components using a peripheral or expansion interconnect. Specifically, the host interface 226 can be connected to a physical interconnect that is used to connect the computer device 220 to the peripheral device 210 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the computer device 220 to the peripheral device 210. Thus, the computer device 220 and the peripheral device 210 can communicate using PCI bus commands or PCIe packets, for example.

The peripheral device 210 can include a client configurable logic circuit 225 including shell logic 230 and client configurable logic 240. The shell logic 230 can include a peripheral interface 212, a management module 214, and data path module 216. The client configurable logic 240 can include hardware that is configurable to implement a hardware accelerator, for example. In other words, the client configurable logic 240 can include logic that is programmable to perform a given function. For example, the client configurable logic 240 can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and/or programmable input/output pins.

The shell logic 230 can be used to encapsulate the client configurable logic 240. For example, the client configurable logic 240 can interface with various components of the shell logic 230 using predefined interfaces so that the client configurable logic 240 is restricted in access to components of peripheral device 210. The shell logic 230 can include logic that isolates different components of the peripheral device 210 from the client configurable logic 240. As one example, hard macros of the peripheral device 210 (such as a configuration access port or circuits for signaling on the physical interconnect) can be masked off so that the client configurable logic 240 cannot directly access the hard macros.

The shell logic 230 can include the peripheral interface 212 for communicating with the computer device 220. Specifically, the peripheral interface 212 can be used to enable communicate with the computer device 220 using a communication protocol and a physical interconnect. As one example, the computer device 220 can communicate with the peripheral device 210 using a command including an address associated with the peripheral device 210. Similarly, the peripheral device 210 can communicate with the computer device 220 using a command including an address associated with the computer device 220. The addresses associated with the various devices connected to host interface 226 can be predefined by a system architect and programmed into the devices. Additionally or alternatively, the communication protocol can include an enumeration sequence where the devices connected to the host interface 226 are queried and where addresses are assigned to each of devices as part of the enumeration sequence. As one example, the host interface 226 can issue queries to each of the devices connected to the host interface 226. The peripheral interface 212 can respond to the queries by providing information about the peripheral device 210, such as how many functions are present on the peripheral device 210, and a size of an address range associated with each of the functions of the peripheral device 210. Based on this information, addresses of the computing system 200 can be allocated such that each function of each device connected to the physical interconnect is assigned a non-overlapping range of addresses. After enumeration, the peripheral interface 212 can route commands to functions of the peripheral device 210 based on an address of the command.

The shell logic can include the management module 214 that can be used for managing and configuring the peripheral device 210. Commands and data can be sent from the computer device 220 to the management module 214 using commands that target the address range of the management module 214. For example, the computer device 220 can generate commands to transfer data (e.g., configuration data) and/or write control registers of the peripheral device 210 that are mapped to one or more addresses within the address range of the management module 214. Writing the control registers can cause the peripheral device 210 to perform operations, such as configuring and managing the peripheral device 210. As a specific example, configuration data corresponding to configurable logic to be implemented in the client configurable logic 240 can be transmitted from the computer device 220 to the peripheral device 210 in one or more commands between host interface 227 and peripheral interface 212. A command 250 to configure the client configurable logic 240 with the configuration data can be transmitted from the computer device 220 to the peripheral device 210. Specifically, the command 250 can write a value to a control register mapped to the management module 214 address space that will begin configuring the client configurable logic 240. In one embodiment, the configuration data can be transferred from the computer device 220 to the peripheral device 210 before the configuration of the client configurable logic 240 begins. For example, the management module 214 can cause the configuration data to be stored in an on-chip or off-chip memory accessible by the peripheral device 210, and the configuration data can be read from the memory when the client configurable logic 240 is being configured. In another embodiment, the configuration data can be transferred from the computer device 220 to the peripheral device 210 after the configuration of the client configurable logic 240 begins. For example, a control register can be written to begin configuration of the client configurable logic 240 and the configuration data can be streamed into or loaded onto the client configurable logic 240 as commands including the configuration data are processed by the management module 214.

The shell logic 230 can include a data path module 216 that can be used to exchange information (e.g., data input/output 260) between the computer device 220 and the peripheral device 210. Specifically, commands and data can be sent from the computer device 220 to the data path module 216 using commands that target the address range of the data path module 216. Similarly, the peripheral device 210 can communicate with the computer device 220 using a command including an address associated with the computer device 220. The data path module 216 can act as a translation layer between the peripheral interface 212 and the client configurable logic 240. Specifically, the data path module 216 can include an interface for receiving information from the client configurable logic 240 and the data path module 216 can format the information for transmission from the peripheral interface 212. Formatting the information can include generating control information for one or more commands and partitioning data into blocks that are sized to meet protocol specifications. Thus, the data path module 216 can be interposed between the client configurable logic 240 and the physical interconnect. In this manner, the client configurable logic 240 can potentially be blocked from formatting commands and directly controlling the signals used to drive the physical interconnect so that the client configurable logic 240 cannot be used to inadvertently or maliciously violate protocols of the physical interconnect.

Figure 3:
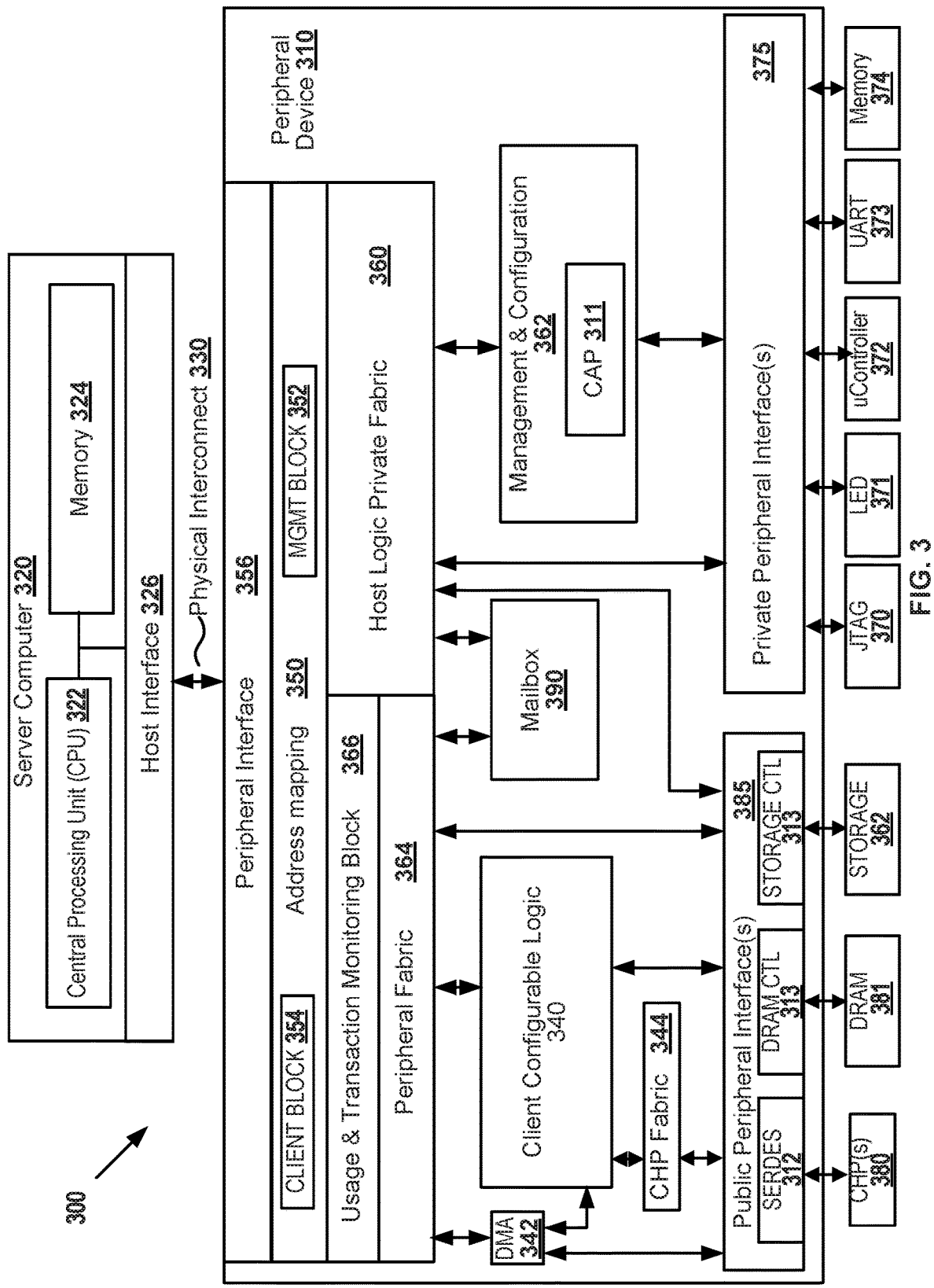
FIG. 3 illustrates a system diagram showing additional features of a system including a client configurable logic circuit.

FIG. 3 illustrates a system diagram showing an example of a system 300 including a peripheral device 310 and a computer device 320. Peripheral device 310 can be similar to peripheral device 210 and computer device 320 can be similar to computer device 220. The computer device 320 and the peripheral device 310 can be connected via a physical interconnect 330. For example, the physical interconnect 330 can be PCI express, PCI, or any other interconnect that couples the computer device 320 to the peripheral device 310. The computer device 320 can include a CPU 322, memory 324, and an host interface 326. For example, the host interface 326 can provide bridging capability so that the computer device 320 can access devices that are external to the computer device 320. For example, the host interface 326 can include root complex functionality as used in PCI express.

The peripheral device 310 can include a client configurable logic circuit and other hardware. The client configurable logic circuit can be configured or programmed to perform various functions of the peripheral device 310. The client configurable logic circuit can be configured multiple times with different configurations so that the client configurable logic circuit can perform different functions to service multiple clients. The functions of the peripheral device 310 can be categorized based upon the purpose or capabilities of each function, or based upon when the function is loaded into the peripheral device 310. For example, the peripheral device 310 can include static logic, reconfigurable logic, and hard macros. The functionality for the static logic, reconfigurable logic, and hard macros can be configured at different times. Thus, the functionality of the peripheral device 310 can be loaded incrementally.

A hard macro can perform a predefined function and can be available when the peripheral device 310 is powered on. For example, a hard macro can include hardwired circuits that perform a specific function. As specific examples, the hard macros can include a configuration access port (CAP) 311 for configuring the peripheral device 310, a serializer-deserializer transceiver (SERDES) 312 for communicating serial data, a memory or dynamic random access memory (DRAM) controller 313 for signaling and controlling off-chip memory (such as a double data rate (DDR) DRAM 381), and a storage controller 314 for signaling and controlling a storage device 382.

Client configurable logic and shell logic may reside on a same programmable logic device. The static logic can be loaded at boot time into the shell logic. Configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and deasserting a reset signal in response to the power event. An initialization sequence can be triggered in response to the power event or the reset being deasserted. The initialization sequence can include reading configuration data stored on the flash device and loading the configuration data onto the peripheral device 310 using the configuration access port 311 so that at least a portion of the shell logic is programmed with the functionality of the static logic. After the static logic is loaded, the peripheral device 310 can transition from a loading state to an operational state that includes the functionality of the static logic.

The client configuration data can be used to configure programmable logic hardware within the client configurable logic while the peripheral device 310 is operational (e.g., after the static logic has been loaded). The client configuration data corresponding to the client configurable logic can be stored in an on-chip or off-chip memory and/or the configuration data can be received or streamed from an interface (e.g., the peripheral interface 356) of the peripheral device 310. The client configurable logic circuit can include several non-overlapping client configurable logic regions, which can each interface with static logic of shell logic. For example, the regions can be arranged in an array or other regular or semi-regular structure. For example, the array structure may include holes or blockages where hard macros are placed within the array structure. The different regions can communicate with each other, the static logic, and the hard macros by using signal lines that can be specified as static logic of shell logic. The different regions can be configured at different points in time so that a first region can be configured at a first point in time and a second region can be configured at a second point in time.

Commands from the computer device 320 bound for the peripheral device 310 can be identified using an address within the command. Specifically, if the address of the command falls within the range of addresses assigned to the peripheral device 310, the command is destined for the peripheral device 310. The command can be sent over the physical interconnect 330 and received at the peripheral interface 356. The peripheral interface 356 can be an endpoint of the physical interconnect 330. It should be understood that the physical interconnect 330 can include additional devices (e.g., switches and bridges) arranged in a fabric for connecting devices or components to the computer device 320.

The address mapping module 350 can analyze the address of the command and determine where to route the command within the peripheral device 310 based on the address. For example, the management block 352 can be assigned a first range of addresses and different functions can be accessed by using different addresses within that range. Commands with addresses falling within the range assigned to the management block 352 can be routed through the host logic private fabric 360 to the different blocks within the host domain. For example, commands can be addressed to a management and configuration block 362. Similarly, the client block 354 can be assigned a second range of addresses and different functions can be accessed by using different addresses within that range.

The management and configuration block 362 can include functions related to managing and configuring the peripheral device 310. For example, the management and configuration block 362 can provide access to the configuration access port 311 so that the reconfigurable logic blocks can be configured. For example, the computer device 320 can send a command to the management and configuration block 362 to initiate loading of the client configuration data into the client configurable logic 340. Client configuration data corresponding to a respective configuration of the client configurable logic 340 can be sent from the computer device 320 to the management block 352. The management block 352 can route the client configuration data through the host logic private fabric 360 to the configuration access port 311 so that the client configuration data can be loaded.

As another example, the management and configuration block 362 can store metadata about the peripheral device 310. For example, versions of the different client configuration data images, update histories, and other information can be stored in memory of the management and configuration block 362. The computer device 320 can read the memory to retrieve some or all of the metadata. Specifically, the computer device 320 can send a read request targeting the memory of the management and configuration block 362 and the management and configuration block 362 can generate read response data to return to the computer device 320.

The management block 352 can also be used to access private peripherals of the peripheral device 310. Private peripherals can include a JTAG (e.g., IEEE 1149.1) controller 370, light emitting displays (LEDs) 371, a microcontroller 372, a universal asynchronous receiver/transmitter (UART) 373, a memory 374 (e.g., a serial peripheral interface (SPI) flash memory), and other components that may be accessible via a host domain. The management block 352 can access the private peripherals by routing commands through the shell logic private fabric 360 and the private peripheral interface(s) 375. The private peripheral interface(s) 375 can directly communicate with the private peripherals.

Public peripherals are configurable and may reside on a client domain and may be accessible by a client configurable logic circuit or may reside on a host domain. For example, the public peripherals can be accessed by addressing commands within the address range assigned to the management block 352. The public peripherals can be accessed by addressing commands within the address range assigned to the client block 354. Examples of the public peripherals are other configurable hardware platform(s) (CHP(s)) 380, DRAM 381 (e.g., DDR DRAM), storage devices 382 (e.g., hard disk drives and solid-state drives), and other various components that can be used to generate, store, or process information. The public peripherals can be accessed via the public peripheral interfaces 385. Thus, the public peripheral interfaces 385 can be an intermediary layer transposed between the public peripherals and the other functions of the peripheral device 310. Specifically, the public peripheral interfaces 385 can format communications to the public peripherals into a native protocol of the public peripherals.

Mailboxes 390 can be used to pass messages and other information between the client domain and the host domain. For example, the mailboxes 390 can include buffers, control registers (such as semaphores), and status registers. By using the mailboxes 390 as an intermediary between the client and host domains, isolation between the client domain and the host domain can be maintained while still providing functionality to pass messages between the two.

The client block 354 can be used to access components residing on the client domain, such as the client configurable logic 340. For example, a command directed to the client configurable logic 340 can cause data to be loaded, processed, and/or returned to the computer device 320. Specifically, the client domain component can be accessed using commands having an address within the range assigned to the client block 354. For example, a command can be sent from the computer device 320 to the client configurable logic 340 via the client block 354. Specifically, commands addressed to the client block 354 can be routed through the peripheral fabric 364 to the client configurable logic 340. Responses from the client configurable logic 340 can be routed through the peripheral fabric 364 to the client block 354, and then back to the computer device 320. Additionally, the data and commands generated by the client configurable logic 340 can be monitored using a usage and command monitoring block 366. The monitoring block 366 can potentially identify commands or data that violate predefined rules and can generate an alert to be sent. Additionally or alternatively, the monitoring block 366 can terminate any commands generated by the client configurable logic 340 that violate any criteria of the monitoring block 366. Additionally, the monitoring block 366 can analyze information moving to or from the client configurable logic 340 so that statistics about the information can be collected and accessed.

Data can also be transferred between the computer device 320 and the configurable logic by programming a direct memory access (DMA) engine 342. The DMA engine 342 can include control and status registers for programming or specifying DMA transfers from a source location to a destination location. As one example, the DMA engine 342 can be programmed to pull information stored within the memory 324 of computer device 320 into the client configurable logic 340 or into the public peripherals of the peripheral device 310. As another example, the DMA engine 342 can be programmed to push data that has been generated by the client configurable logic 340 to the memory 324 of the computer device 320. The data generated by the client configurable logic 340 can be streamed from the client configurable logic 340 or can be written to the public peripherals, such as the memory 381 or storage 382.

The client configurable logic 340 can communicate with other configurable hardware platforms 380. For example, the other configurable hardware platforms 380 can be connected by one or more serial lines that are in communication with the SERDES 312. The client configurable logic 340 can generate commands to the different configurable hardware platforms 380, and the commands can be routed through the CHP fabric 344 to the corresponding serial lines (via the SERDES 312) of the configurable hardware platforms 380. Similarly, the client configurable logic 340 can receive information from other configurable hardware platforms 380 using the reverse path.

Figure 4:
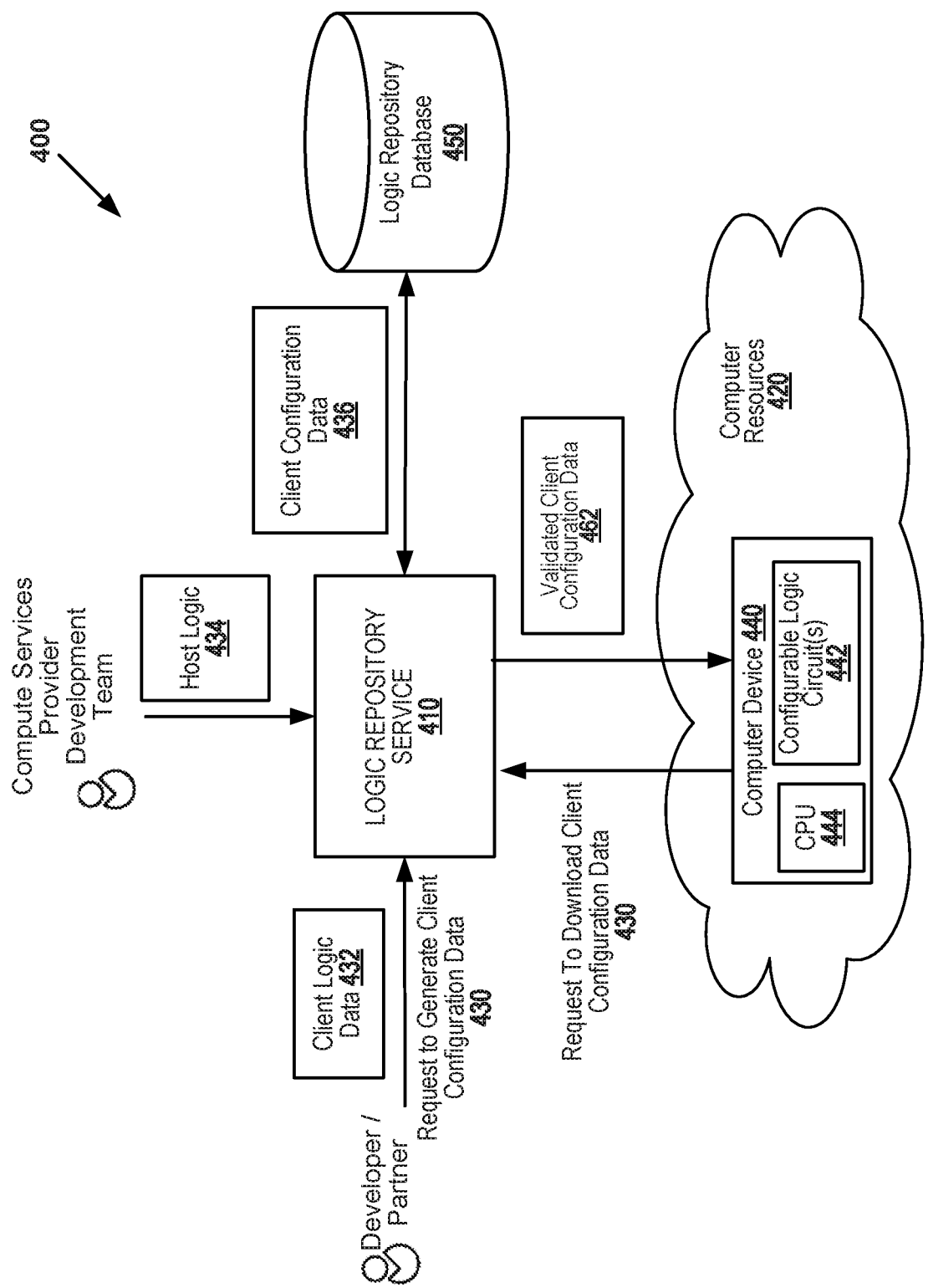
FIG. 4 illustrates a system diagram showing an example of a system including a logic repository service for supplying configuration data to a client configurable logic circuit.

FIG. 4 illustrates a system diagram showing an example of a system 400 including a logic repository service 410 for managing configuration data that can be used to configure configurable resources within a fleet of compute resources 420. System 400 can be utilized within the cloud infrastructure of FIG. 1. A cloud service provider can maintain the fleet of computer resources 420 for users of the services to deploy when a computing task is to be performed. The computer resources 420 can include computer devices 440 having client configurable logic circuit(s) 442 that can be programmed to include client specific hardware accelerator(s). The cloud service provider can manage the computer resources 420 using techniques disclosed herein to manage the configuration and operation of the client configurable logic circuit(s) 442. As one example, a host privileged machine (e.g., Host Privileged Virtual Machine 120) can execute a logic repository service 410 for accessing client logic data 432 (e.g., a specific client logic image/design) specified by a user, generating client configuration data 436 for configuring the client configurable logic circuit based on the logic design of the user, and downloading the validated configuration data 462 in response to a request 460 to configure an instance of the client configurable logic circuit. The download request 460 can be from the user that developed the configurable logic (e.g., a partner) or from a user that has acquired a license to use the configurable logic (e.g., a client). The client configuration data 436 can be created by the host privileged machine, a user, or a third-party separate from the user or the host privileged machine. For example, a marketplace of accelerator intellectual property (IP) can be provided to the users of the cloud infrastructure, and the users can potentially increase the speed of their applications by selecting an accelerator from the marketplace.

The logic repository service 410 can be a network-accessible service, such as a web service. Web services are commonly used in cloud computing. A web service is provided at a network address over the web or the cloud. Users can initiate web service requests to computer devices of a cloud infrastructure and the computer devices can process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a computer device. When a web service receives the API request from a client device, the web service can generate a response to the request and send the response to the endpoint identified in the request. Additionally or alternatively, the web service can perform actions in response to the API request without generating a response to the endpoint identified in the request.

The logic repository service 410 can receive an API request 430 to generate client configuration data for a client configurable logic circuit, such as the client configurable logic circuit(s) 442 of the computer device 440. For example, the API request 430 can be originated by a developer or partner user of the compute services provider. The request 430 can include fields for specifying data and/or metadata about the logic design, the configurable hardware platform, user information, access privileges, production status, and various additional fields for describing information about the inputs, outputs, and users of the logic repository service 410. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying client logic data 432 for implementation on the configurable hardware platform. Specifically, a specification of the client logic data 432 and/or of the host logic 434 can be a collection of files, such as source code written in a hardware description language (HDL), a netlist generated by a logic synthesis tool, and/or placed and routed logic gates generated by a place and route tool.

The compute resources 420 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example resources can include different operating systems, application programs, and drivers. One example instance type can comprise the computer device 440 including a central processing unit (CPU) 444 in communication with the client configurable logic circuit(s) 442. The client configurable logic circuit(s) 442 can include programmable logic such as an FPGA, a programmable logic array (PLA), a programmable array logic (PAL), a generic array logic (GAL), or a complex programmable logic device (CPLD), for example. As specific examples, an "F1.small" instance type can include a first type of computer device with one capacity unit of FPGA resources, an "F1.medium" instance type can include the first type of computer device with two capacity units of FPGA resources, an "F1.large" instance type can include the first type of computer device with eight capacity units of FPGA resources, and an "F2.large" instance type can include a second type of computer device with eight capacity units of FPGA resources.

The logic repository service 410 can generate client configuration data 436 in response to receiving the API request 430. The generated client configuration data 436 can be based on the client logic data 432 and the host logic 434. Specifically, the generated client configuration data 436 can include information that can be used to program or configure the client configurable logic circuit(s) 442 so that it performs the functions specified by the client logic data 432 and the host logic 434. As one example, the cloud service provider can generate the host logic 434 including logic for interfacing between the CPU 444 and the client configurable logic circuit(s) 442. Specifically, the host logic 434 can include logic for masking or shielding the client logic data 432 from communicating directly with the CPU 444 so that all CPU-configurable logic commands pass through the host logic 434. In this manner, the host logic 434 can potentially reduce security and availability risks that could be introduced by the client logic data 432.

Generating the client configuration data 436 can include performing checks and/or tests on the client logic data 432, integrating the client logic data 432 into a host logic 434 wrapper, synthesizing the client logic data 432, and/or placing and routing the client logic data 432. Checking the client logic data 432 can include verifying the client logic data 432 complies with one or more criteria of the compute services provider. For example, the client logic data 432 can be analyzed to determine whether interface signals and/or logic functions are present for interfacing to the host logic 434. In particular, the analysis can include analyzing source code and/or running the client logic data 432 against a suite of verification tests. The verification tests can be used to confirm that the configurable logic is compatible with the shell logic. As another example, the client logic data 432 can be analyzed to determine whether the client logic data 432 fits within a designated region of the specified instance type. As another example, the client logic data 432 can be analyzed to determine whether the client logic data 432 includes any prohibited logic functions, such as ring oscillators or other potentially harmful circuits. As another example, the client logic data 432 can be analyzed to determine whether the client logic data 432 has any naming conflicts with the host logic 434 or any extraneous outputs that do not interface with the host logic 434. As another example, the client logic data 432 can be analyzed to determine whether the client logic data 432 attempts to interface to restricted inputs, outputs, or hard macros of the client configurable logic circuit(s) 442. If the client logic data 432 passes the checks of the logic repository service 410, then the client configuration data 436 can be generated. If any of the checks or tests fail, the generation of the client configuration data 436 can be aborted.

Generating the client configuration data 436 can include compiling and/or translating source code of the client logic data 432 and the host logic 434 into data that can be used to program or configure the client configurable logic circuit(s) 442. For example, the logic repository service 410 can integrate the client logic data 432 into a host logic 434 wrapper. Specifically, the client logic data 432 can be instantiated in a system design that includes the client logic data 432 and the host logic 434. The integrated system design can be synthesized, using a logic synthesis program, to create a netlist for the system design. The netlist can be placed and routed, using a place and route program, for the instance type specified for the system design. The placed and routed design can be converted to client configuration data 436 which can be used to program the client configurable logic circuit(s) 442. For example, the client configuration data 436 can be directly output from the place and route program.

As one example, the generated client configuration data 436 can include a complete or partial bitstream for configuring all or a portion of the configurable logic of an FPGA. An FPGA can include configurable logic and non-configurable logic. The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different regions which can be configured independently of one another. As one example, a full bitstream can be used to configure the configurable logic across all of the regions and a partial bitstream can be used to configure only a portion of the configurable logic regions. The non-configurable logic can include hard macros that perform a specific function within the FPGA, such as input/output blocks (e.g., serializer and deserializer (SERDES) blocks and gigabit transceivers), analog-to-digital converters, memory control blocks, test access ports, and configuration logic for loading the configuration data onto the configurable logic.

The logic repository service 410 can store the generated client configuration data 436 in a logic repository database 450. The logic repository database 450 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the logic repository service 410. Additionally, the logic repository service 410 can be used to store input files (such as the specifications for the client logic data 432 and the host logic 434) and metadata about the logic designs and/or the users of the logic repository service 410. The generated client configuration data 436 can be indexed by one or more properties such as a user identifier, an instance type or types, a marketplace identifier, a machine image identifier, and a configurable hardware identifier, for example.

The logic repository service 410 can receive an API request 460 to download configuration data. For example, the request 460 can be generated when a user of the compute resources 420 launches or deploys a new instance (e.g., an F1 instance) within the compute resources 420. As another example, the request 460 can be generated in response to a request from an application executing on an operating instance. The request 460 can include a reference to the source and/or destination instance, a reference to the configuration data to download (e.g., an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 450, and validated configuration data 462 (e.g. a full or partial bitstream) can be downloaded to the requesting instance (e.g., computer device 440). The validated configuration data 462 can be used to configure the configurable logic of the destination instance.

The logic repository service 410 can verify that the validated configuration data 462 can be downloaded to the requesting instance. Validation can occur at multiple different points by the logic repository service 410. For example, validation can include verifying that the client logic data 432 is compatible with the host logic 434. In particular, a regression suite of tests can be executed on a simulator to verify that the host logic 434 performs as expected after the client logic data 432 is added to the design. Additionally or alternatively, it can be verified that the client logic data 432 is specified to reside only in reconfigurable regions that are separate from reconfigurable regions of the host logic 434. As another example, validation can include verifying that the validated configuration data 462 is compatible with the instance type to download to. As another example, validation can include verifying that the requestor is authorized to access the validated configuration data 462. If any of the validation checks fail, the logic repository service 410 can deny the request to download the validated configuration data 462. Thus, the logic repository service 410 can potentially safeguard the security and the availability of the computer resources 420 while enabling a user to customize hardware of the computer resources 420.

Figure 5:
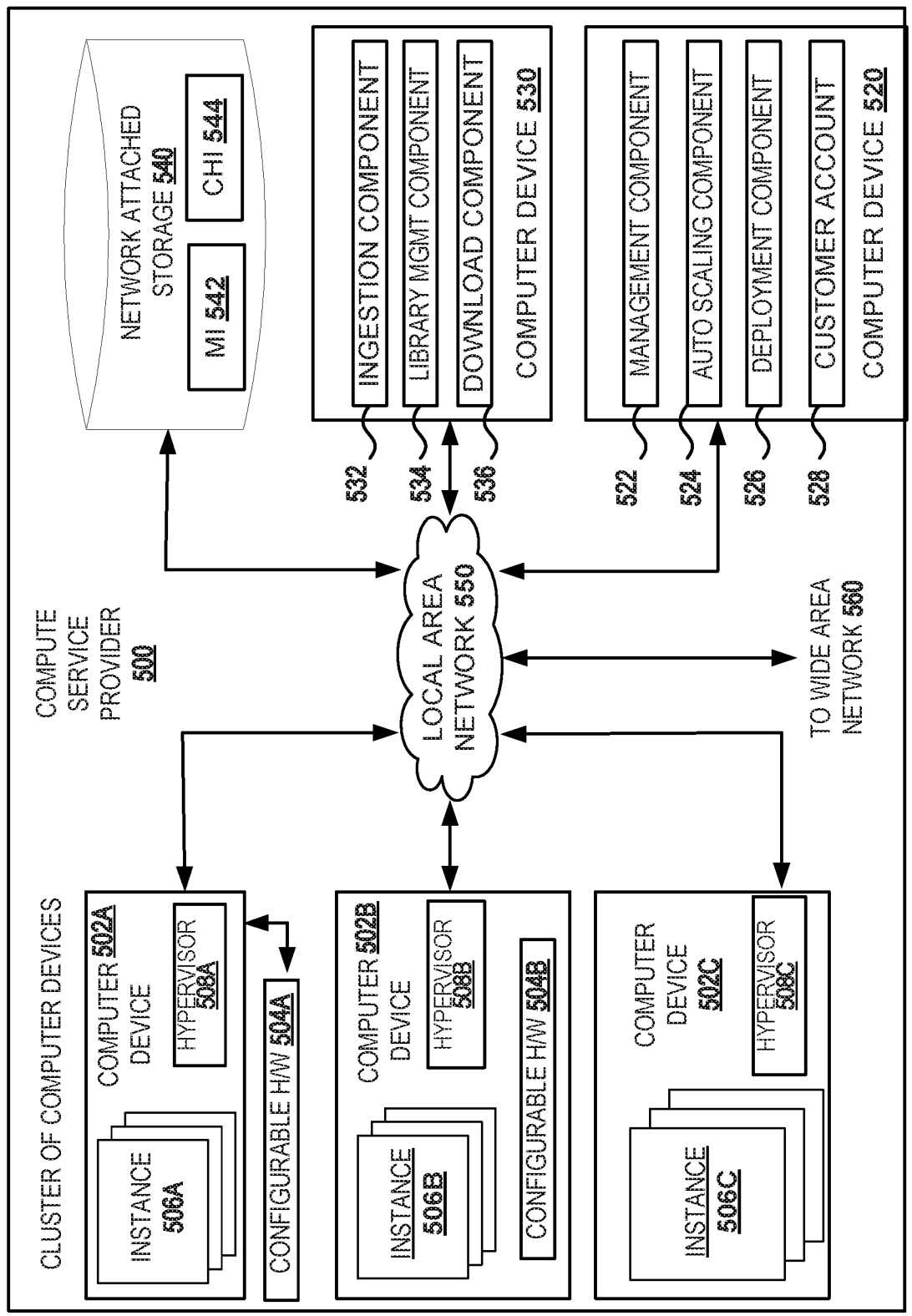
FIG. 5 illustrates an example system diagram showing a plurality of virtual machine instances running in a multi-tenant environment including computer devices having a client configurable logic circuit.

FIG. 5 illustrates a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of clients operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of computer devices 502A-502C. While only three computer devices are shown, any number can be used, and large centers can include thousands of computer devices. The computer devices 502A-502C can provide computing resources for executing instances 506A-506C. In one embodiment, the instances 506A-506C are virtual machines. As known in the art, a virtual machine can include logical resources that are emulated using physical components of machine(s) (e.g. computers). In the example of a virtual machine, each of the computer devices 502A-502C can be configured to execute a hypervisor 508 or another type of program configured to enable the execution of multiple instances 506 on a single computer device. Additionally, each of the instances 506 can be configured to execute one or more applications. The applications can include user or non-privileged programs, kernel or privileged programs, and/or drivers. In another embodiment (not shown), the instances can include an operating system and application programs controlled by a single client. Thus, the computer service provider 500 can partition the resources of a given computer device among multiple clients (such as by providing a different virtual machine to each client) and/or provide the full resources of a computer device to a single client. Each of instances 506 can reside within a respective client domain for the respective client (along with client configurable logic hardware).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The computer devices 502A-502C can include a heterogeneous collection of different hardware resources or instance types. Some of the hardware instance types can include configurable hardware that is at least partially configurable by a user of the compute service provider 500. One example of an instance type can include the computer device 502A which is in communication with client configurable logic hardware 504A. Specifically, the computer device 502A and the client configurable logic hardware 504A can communicate over a local interconnect such as PCIe. Another example of an instance type can include the computer device 502B and client configurable logic hardware 504B. For example, the client configurable logic hardware 504B can be integrated within a multi-chip module or on the same die as a CPU of the computer device 502B. Yet another example of an instance type can include the computer device 502C without any client configurable logic hardware. Thus, hardware instance types with and without configurable logic can be present within the resources of the compute service provider 500.

One or more computer devices 520 can be reserved for executing software components for managing the operation of the computer devices 502 and the software instances 506. For example, the computer device 520 can execute a management component 522. A client can access the management component 522 to configure various aspects of the operation of the software instances 506 purchased by the client. For example, the client can purchase, rent or lease instances and make changes to the configuration of the software instances. The configuration information for each of the software instances can be stored as a machine image (MI) 542 on the network-attached storage 540. As a specific example, the MI 542 can describe the information used to launch a VM instance. The MI can include a template for a root volume of the instance (e.g., an OS and applications), launch permissions for controlling which client accounts can use the MI, and a block device mapping which specifies volumes to attach to the instance when the instance is launched. The MI can also include a reference to a configurable hardware image (CHI) 542 which is to be loaded on configurable hardware 504 when the instance is launched. The CHI includes configuration data for programming or configuring at least a portion of the configurable hardware 504. As another specific example, the MI 542 can describe the information used to launch an instance of an operating system directly on one of the computer devices 520.

The client can also specify settings regarding how the purchased instances are to be scaled in response to demand. The management component can further include a policy document to implement client policies. An auto scaling component 524 can scale the instances 506 based upon rules defined by the client. In one embodiment, the auto scaling component 524 allows a client to specify scale-up rules for use in determining when new instances should be instantiated and scale-down rules for use in determining when existing instances should be terminated. The auto scaling component 524 can consist of a number of subcomponents executing on different computer devices 502A-502C or other computer devices. The auto scaling component 524 can monitor available computing resources over an internal management network and modify resources available based on need.

A deployment component 526 can be used to assist clients in the deployment of new instances 506 of computing resources. The deployment component can have access to account information associated with the instances, such as who is the owner of the account, credit card information, country of the owner, etc. The deployment component 526 can receive a configuration from a client that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 526 can utilize the client-provided configuration and cache logic to configure, prime, and launch new instances 506. For example, the deployment component 526 can be invoked when a client launches an instance from a control console, another instance, or a marketplace page. The control console can be a web-based service that provides an interface to a client of the compute service provider 500 so that the client can manage his or her account and access services. As one example, the control console can enable a user to upload MIs and/or CHIs to a private catalog, and images corresponding to a particular MI or CHI can be selected by the user from the private catalog when an instance is to be deployed. The configuration, cache logic, and other information used for launching instances may be specified by a client using the management component 522 or by providing this information directly to the deployment component 526. The instance manager can be considered part of the deployment component.

Client account information 528 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, a listing of the MI's and CHI's accessible to the client, etc.

One or more computer devices 530 can be reserved for executing software components for managing the download of configuration data to configurable hardware 504 of the computer devices 502A-502C. For example, the computer device 530 can execute a logic repository service comprising an ingestion component 532, a library management component 534, and a download component 536. Computer device 530 can implement functions of logic repository service 410. The ingestion component 532 can receive shell logic and configurable logic designs or specifications and generate configuration data that can be used to configure the configurable hardware 504. The library management component 534 can be used to manage source code, user information, and configuration data associated with the logic repository service. For example, the library management component 534 can be used to store configuration data generated from a user's design in a location specified by the user on the network-attached storage 540. In particular, the configuration data can be stored within a configurable hardware image 542 on the network-attached storage 540. Additionally, the library management component 534 can manage the versioning and storage of input files (such as the specifications for the configurable logic and the shell logic) and metadata about the logic designs and/or the users of the logic repository service. The library management component 534 can index the generated configuration data by one or more properties such as a user identifier, an instance type, a marketplace identifier, a machine image identifier, and a configurable hardware identifier, for example. The download component 536 can be used to authenticate requests for configuration data and to transmit the configuration data to the requestor when the request is authenticated. For example, agents on the computer devices 502A-B can send requests to the download component 536 when the instances 506 are launched that use the configurable hardware 504. As another example, the agents on the computer devices 502A-B can send requests to the download component 536 when the instances 506 request that the configurable hardware 504 be partially reconfigured while the configurable hardware 504 is in operation.

The network-attached storage (NAS) 540 can be used to provide storage space and access to files stored on the NAS 540. For example, the NAS 540 can include one or more computer devices used for processing requests using a network file sharing protocol, such as Network File System (NFS). The NAS 540 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 550.

The network 550 can be utilized to interconnect the computer devices 502A-502C, the computer devices 520 and 530, and the storage 540. The network 550 can be a local area network (LAN) and can be connected to a Wide Area Network (WAN) 560 so that end users can access the compute service provider 500. It should be appreciated that the network topology illustrated in FIG. 5 has been simplified and that many more networks and networking devices can be utilized to interconnect the various computing systems disclosed herein.

Figure 6:
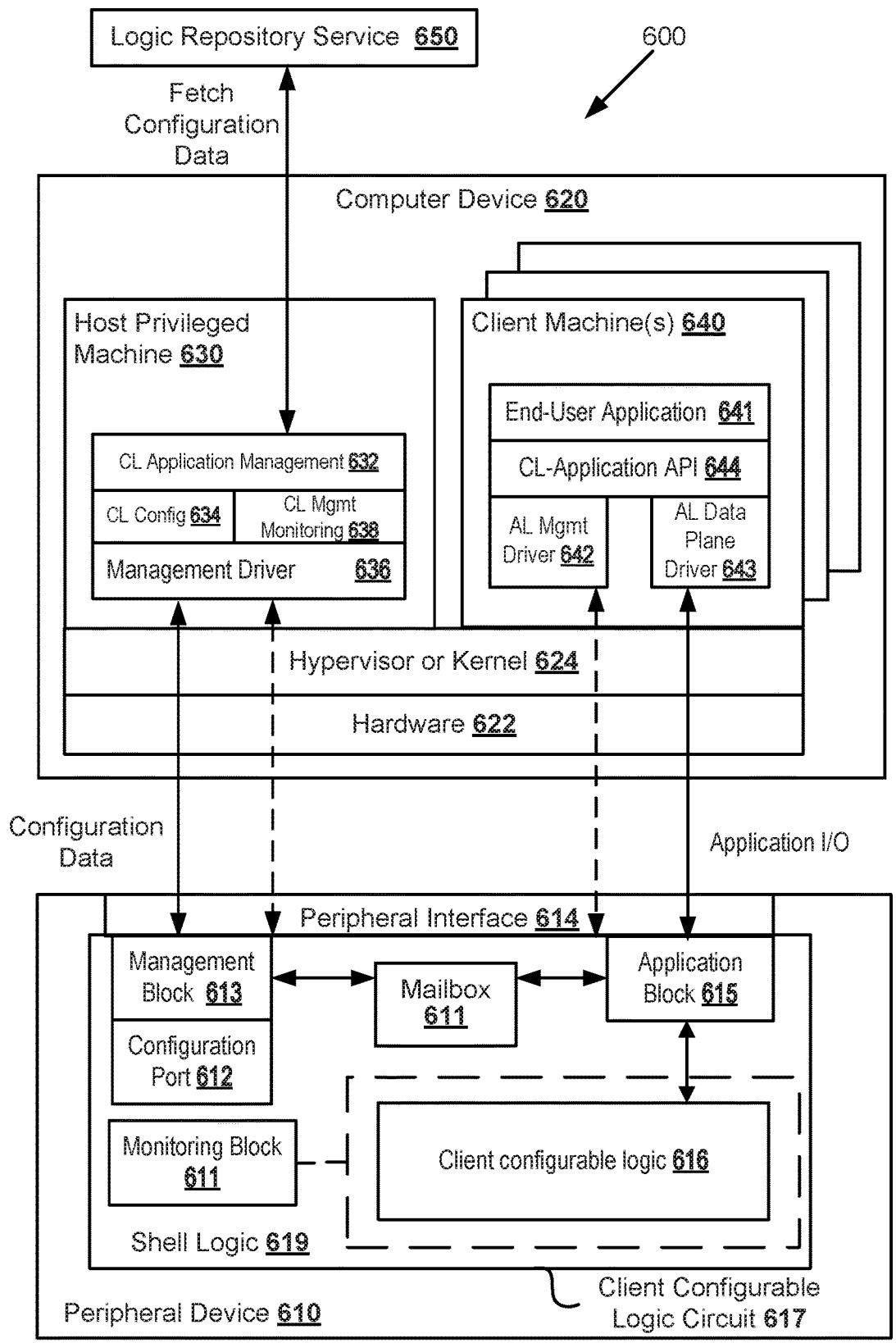
FIG. 6 illustrates an example system according to certain embodiments including a monitoring block.

FIG. 6 illustrates details of an example system 600 including a peripheral device 610. The peripheral device 610 can be connected to a computer device 620 using a local physical interconnect, such as PCIe. In an alternative embodiment, the peripheral device 610 can be integrated within the hardware of the computer device 620. As one example, the computer device 620 can be one of the plurality of computer devices 502A-502B of the compute service provider 500 of FIG. 5.

The computer device 620 can have underlying hardware 622 including one or more CPUs, memory, storage devices, interconnection hardware, etc. The hypervisor or kernel layer 624 can be classified as a type 1 or type 2 hypervisor. A type 1 hypervisor can run directly on the host hardware 622 to control the hardware and to manage guest operating systems. A type 2 hypervisor can run within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A host privileged machine 630 (such as Domain 0 of the Xen hypervisor) can be part of the hypervisor or separated therefrom and generally includes device drivers needed for accessing the hardware 622. Host privileged machine 630 can reside on a host domain wherein client machine(s) 640 can each reside on a client domain with a corresponding client configurable logic circuit 617. Client machine(s) 640 can be logical units of isolation within the hypervisor. Each client machine 640 can be allocated its own portion (e.g., using time or space division) of the hardware layer's memory, CPU allocation, storage, interconnect bandwidth, etc. to the corresponding client domain Additionally, each client machine 640 can include a guest virtual machine and its own guest operating system. As such, each client machine 640 can be an abstract portion of capacity designed to support its own virtual machine independent of the other domains.

The host privileged machine 630 can be used to perform management services for the client machines 640 and the peripheral device 610. The host privileged machine 630 can communicate with web services (such as a deployment service, a logic repository service 650, and a health monitoring service) of the compute service provider, the client machines 640, and the peripheral device 610. The management services can include services for launching and terminating client machines 640, and configuring, reconfiguring, and tearing down the configurable logic of the peripheral device 610. As a specific example, the host privileged machine 630 can launch a new client machine 640 in response to a request from a deployment service (such as the deployment component 426 of FIG. 4). The request can include a reference to an MI and/or a CHI. The MI can specify programs and drivers to load on the client machine 640 and the CHI can specify configuration data to load on the peripheral device 610. The host privileged machine 630 can initialize the client machine 640 based on the information associated with the MI and can cause the configuration data associated with the CHI to be loaded onto the peripheral device 610. The initialization of the client machine 640 and the peripheral device 610 can occur concurrently so that the time to make the instance operational can be reduced.

The host privileged machine 630 can be used to manage programming and monitoring of the peripheral device 610. By using the host privileged machine 630 for this purpose, access to the configuration data a lower privilege levels can be restricted from directly accessing the host privileged machine 630. The configuration ports of the peripheral device 610 can be restricted. Specifically, users with us, the configurable logic cannot be modified without using the infrastructure of the cloud service provider and any third party IP used to program the configurable logic can be protected from viewing by unauthorized users.

The host privileged machine 630 can include a client configurable logic (CL) management module 632 for communicating with web services (such as the logic repository service 650 and a health monitoring service), the peripheral device 610, and the client machines 640. For example, the CL application management module 632 can issue a request to the logic repository service 650 to fetch configuration data in response to a client machine 640 being launched. The CL application management module 632 can communicate with the client machine 640 using shared memory of the hardware 622 or by sending and receiving inter-partition messages over the interconnect connecting the computer device 620 to the peripheral device 610. The messages can include requests by an end-user application 641 to reconfigure or tear-down the peripheral device 610. The CL application management module 632 can issue a request to the logic repository service 650 to fetch configuration data in response to a request to reconfigure the peripheral device 610. The CL application management module 632 can initiate a tear-down sequence in response to a request to tear down the peripheral device 610. The CL application management module 632 can perform watchdog related activities to determine whether the communication path to the client machine 640 is functional.

CL configuration module 634 can access the configuration port 612 (e.g., a configuration access port) of the peripheral device 610 so that client configuration data can be loaded onto the peripheral device 610. For example, the CL configuration layer 634 can send a command or commands to the configuration port 612 to perform a full or partial configuration of the peripheral device 610. The CL configuration module 634 can send the client configuration data (e.g., a bitstream) to the configuration port 612 so that the configurable logic can be programmed according to the client configuration data.

CL configuration module 634 can also configured shell logic 619 used to encompass client configurable logic 616 an isolate the client configurable logic 616 to a user domain with a corresponding client machine 640. As disclosed herein, shell logic 619 can be implemented on a same logic device (e.g., FPGA) as the client configurable logic 616.

Shell logic 619 can facilitate interaction between client machine 640 and/or host privileged machine 630 to the client configurable logic 616. Shell logic 619 can be used to encapsulate, repackage, or otherwise alter data transmitted between one of client machines 640 and a corresponding portion of client configurable logic 616 included within the same domain. The encapsulation or alteration of the data can prevent the virtual machine and client configurable application logic within the same client domain from accessing resources or functionality of the host domain. For example, shell logic 619 may prevent configurable logic 616 from directly accessing peripheral interface 614. Instead, any communications that traverse peripheral interface 614 from client configurable logic 616 may first be encapsulated or altered by shell logic 619.

Management driver 636 can be used for communicating over the physical interconnect connecting the computer device 620 to the peripheral device 610. The management driver 636 can encapsulate commands, requests, responses, messages, and data originating from the host privileged machine 630 for transmission over the physical interconnect. Additionally, the management driver 636 can de-encapsulate commands, requests, responses, messages, and data sent to the host privileged machine 630 over the physical interconnect. Specifically, the management driver 636 can communicate with the management block 613 of the peripheral device 610. For example, the management block 613 can include physical or virtual function(s) mapped to an address range during an enumeration of devices connected to the physical interconnect. The management driver 636 can communicate with the management block 613 by addressing commands to the address range assigned to the management block 613. Mailbox 611 can be similar to mailbox 390 and can be used to pass data between management block 613 and application block 615 while still maintain domain separation.

The host privileged machine 630 can include a CL management and monitoring module 638. The CL management and monitoring module 638 can monitor and analyze commands occurring on the physical interconnect to determine a health of the peripheral device 610 and/or to determine usage characteristics of the peripheral device 610.

The peripheral device 610 can include non-configurable hard macros and configurable logic. The hard macros can perform specific functions within the peripheral device 610, such as input/output blocks (e.g., serializer and deserializer (SERDES) blocks and gigabit transceivers), analog-to-digital converters, memory control blocks, test access ports, and a configuration port 612. The CL can be programmed or configured by loading configuration data onto the peripheral device 610. For example, the configuration port 612 can be used for loading the configuration data. As one example, configuration data can be stored in a memory (such as a Flash memory) accessible by the configuration port 612 and the configuration data can be automatically loaded during an initialization sequence (such as during a power-on sequence) of the peripheral device 610. Additionally, the configuration port 612 can be accessed using an off-chip processor or an interface within the peripheral device 610.

The peripheral interface logic 614 can include circuitry (e.g., hard macros and/or configurable logic) for signaling on the physical interconnect and implementing a communications protocol. The communications protocol specifies the rules and message formats for communicating over the interconnect. The application block 615 can be used to communicate with drivers of the client machines 640. Specifically, the application block 615 can be a physical or virtual function mapped to an address range during an enumeration of devices connected to the physical interconnect. The application drivers can communicate with the application block 615 by addressing commands to the address range assigned to the application block 615. Specifically, the application block 615 can communicate with an configurable logic management driver 642 to exchange commands, requests, responses, messages, and data. The application block 615 can communicate with an configurable data driver 643 to exchange commands, requests, responses, messages, and data.

The shell logic 619 can shield the interfaces of at least some of the hard macros from the end-users so that the end-users have limited access to the hard macros and to the physical interconnect. For example, the shell logic 619 can include the configuration port 612, the management block 613, the peripheral interface 614, and the application block 615. The end-users can cause the client configurable logic 616 to be loaded into the peripheral device 610 to enable a service and can communicate with the client configurable logic 616 from the client machines 640 (via the application block 615) to access already configured configurable logic 616.

Monitoring block 611 can be used to monitor the client configurable logic 616 to determine if an errant condition exists as a result of utilizing a client specified or other configuration of client configurable logic 616. Techniques used herein can enable clients of a cloud service provider to have access to hardware resource(s) (such as the client configurable logic 616) of a cloud infrastructure system. Because the cloud infrastructure system may have limited insight into a client-specified configuration of the client configurable logic 616, risk exists wherein a particular configuration of the client configurable logic 616 may damage components of a cloud infrastructure, interfere with operations of the cloud infrastructure, interfere with other client machines(s), or interfere with devices within another client's domain. Damage to a component can include causing the component to be inoperable, generate spurious errors, lose functionality, operate outside of its specifications, or any combination of the preceding.

Some non-limiting examples of errant behavior may include over utilizing hardware resources beyond their specified or safe operating margins (e.g., a power bug that may induce excess power draw by a device or excessive heat generation), a denial of service attack, and a non-responsive client configurable logic 616 that may induce stalls from commands to the client configurable logic 616 that are unanswered. Monitoring block 611 can include or interface with one or more sensors to determine errant conditions. For example, monitoring block 611 can interface with a temperature and/or power consumption monitoring sensor that may be coupled to a component of a cloud infrastructure system. As another example, monitoring block 611 can monitor communications to or from client configurable logic 616 to determine if a timeout has occurred or a statistically significant number of timeouts have occurred. A timeout can indicate that a transmission to client configurable logic 616 has been unanswered and may indicated non-operable client configurable logic 616. Monitoring block 611 can log statistics indicating a number of actions that have been requested to be performed by client configurable logic 616 and/or a number of completions of the requests. Statistics regarding commands traversing a hardware interface (e.g., a PCIe interface) via peripheral interface 614 may be monitored to determine if service is denied. For example, the hardware interface can be denied by flooding the interface with errant commands that prevent nominal traffic from traversing the hardware interface or the hardware interface may be purposely or unintentionally stalled. Monitoring block 611 can include address protections to prevent commands generated by client configurable logic 616 to access memory address locations outside of the client domain on which the client configurable logic 616 resides. Monitoring block 611 may monitor transactions to or from client configurable logic 616 to ensure that protocols are being correctly followed.

Monitoring block 611 can, upon detecting errant behavior isolate the client configurable logic 616. Isolation can be accomplished through the use of multiplexers or switches that can be used to physically separate client configurable logic 616 from shell logic 619, for example. Monitoring block 611 can be included within a host domain and can be included within shell logic 619. For example, monitoring block 611 and/or shell logic 619 can be implemented within configurable logic hardware (such as within an FGPA). Even though configurable logic 616 may be isolated, configuration port 612 may still be enabled to access client configurable logic 616 in order to reconfigure client configurable logic 616 to a known good or other configuration. The known good configuration can simply be a blanking of the circuit (e.g., clearing the configuration to a default or non-functional state). In certain embodiments, monitoring block 611 can induce the host platform to communicate an errant status of the access client configurable logic 616 to a client virtual machine 640. The client virtual machine 640 can, upon receiving the communication, cause the client configurable logic 616 to be reconfigured to a different state.

The client machine 640 can include functionality for interfacing an end-user application 641 to the peripheral device 610. Specifically, the client machine 640 can include a CL-Application API 644 for providing the end-user application 641 with access to the peripheral device 610. The CL-Application API 644 can include a library of methods or functions for communicating with the peripheral device 610 and the host privileged machine 630. For example, the end-user application 641 can send a command or data to the client configurable logic 616 by using an API of the CL-Application API 644. In particular, the API of the CL-Application API 644 can interface with the configurable logic (AL) data driver 643 which can generate a command targeted to the application block 615 which can communicate with the client configurable logic 616. In this manner, the end-user application 641 can cause the client configurable logic 616 receive, process, and/or respond with data to potentially accelerate tasks of the end-user application 641. As another example, the end-user application 641 can send a command or data to the host privileged machine 630 by using an API of the CL-Application API 644. In particular, the API of the CL-Application API 644 can interface with the AL management driver 642 which can generate a command targeted to the application block 615. In this manner, the end-user application 641 can cause the host privileged machine 630 to provide operational or metadata about the peripheral device 610 and/or to request that the client configurable logic 616 be reconfigured.

The client machine 640 in conjunction with the hypervisor or kernel 624 can be used to limit the operations available to perform over the physical interconnect by the end-user application 641. For example, the cloud service provider can provide the AL management driver 642, the AL data driver 643, and the CL-Application API 644 (such as by associating the files with a machine image). These components can be protected from modification by only permitting users and services having a higher privilege level than the end-user to write to the files. The AL management driver 642 and the AL data driver 643 can be restricted to using only addresses within the address range of the application block 615. Additionally, an input/output memory management unit (I/O MMU) can restrict interconnect commands to be within the address ranges of the application block 615 or the management function 613.

Figure 7:
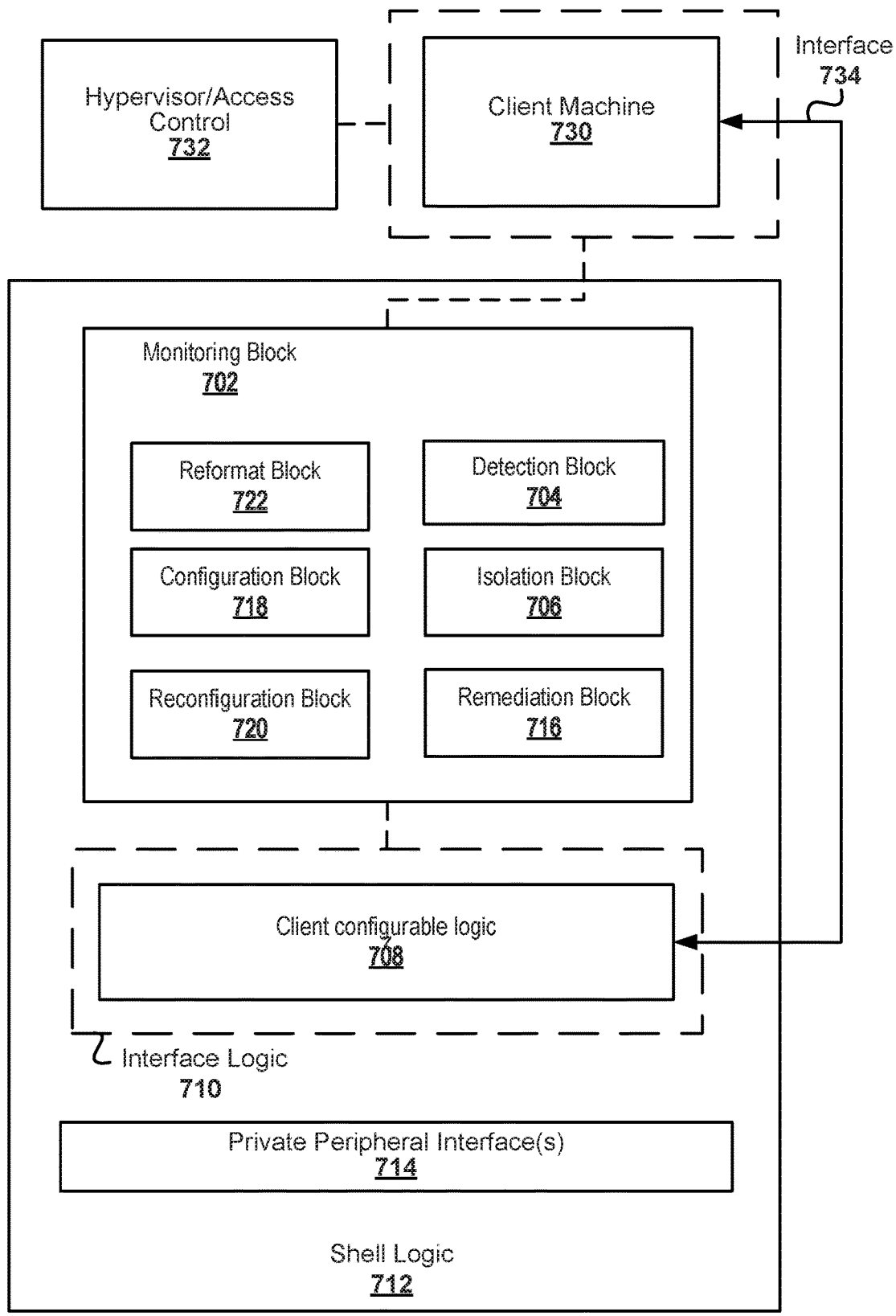
FIG. 7 illustrates an example system including additional details regarding the monitoring block of FIG. 6.

FIG. 7 illustrates shell logic 712 that can be used within a computer device 700. For example, computer device 700 can be similar to peripheral device 610 or one of computer devices 502A-502C. Shell logic 712 can be similar to shell logic 619. Shell logic 712 can, as illustrated, include monitoring block 702 which can be similar to monitoring block 611. Shell logic can encapsulate client configurable logic 708 (which may operating on a client domain) via interface logic 710. Shell logic 712 can interface with one or more physical or logical devices, such as peripheral interface 614. An example interface 734 is illustrated coupling client machine 740 to client configurable logic 708. Client machine 730 may be a client virtual or physical machine that may reside within a same domain as a corresponding client configuration of client configurable logic 708. Hypervisor/access control 732 can be used to isolate client machine 730 to the domain.

Monitoring block 702 can include sub-blocks such as detection block 704, isolation block 706, remediation block 716, configuration block 718, and reconfiguration block 720. Monitoring block 702 can be configured to determine whether client machine 730 or client configurable logic 708 is performing or has performed an errant action that may damage computer device 700 (or another component of a cloud infrastructure system that includes computer device 700) or otherwise interfere with operation of a cloud infrastructure to which computer device 700 belongs. Shell logic 714 can include private peripheral interface(s) 714, which can be similar to private peripheral interface 375 that can be accessible by client configurable logic 708. By implementing monitoring block 702 within shell logic 712 instead of via a high level operating system, low level insight into operations of client configurable logic 708 can be determined. Furthermore, determination of errant behavior associated with client configurable logic 708 can be done expeditiously and corrective actions performed relatively quickly, preventing possible damage or disruption to a cloud infrastructure system.

As disclosed herein, shell logic may reside on a same logic device as client configurable logic 708. Interface logic 710 can, for example, include Advanced eXtensible Interface (AXI) interfaces which can be monitored via detection block 704 to determine whether an errant condition exists. Detection block 704 can collect statistical information regarding data passed between client configurable logic 708 and shell logic 712, a lack of data passing between client configurable logic 708 and shell logic 712, memory addresses accessed by client configurable logic 708, utilization of components of computer device 700 (or other components of a cloud infrastructure), sensor reading(s), etc., Detection block 704 can include one or more registers for storing information such as accumulated statistical information and/or threshold values that, when met by a corresponding register storing accumulated statistical information, be used to determine an errant condition. The threshold values may also indicate a boundary that, if exceeded, may indicate an errant action. The boundary can be a memory address, power value, temperature value, etc.

Isolation block 706 can, in response to detection of an errant condition by detection block 704, mitigate the errant conditions by, for example, isolating client configurable logic 708 via interface logic 710 (e.g., by physically deactivating interfaces to client configurable logic 708) and/or may alter functionality of client configurable logic 708 (such as by modifying a clock rate that client configurable logic 708 operates at). Reconfiguration block 720 can, in response to detection of an errant condition by detection block 704, clear or otherwise reload logic of client configurable logic 708. Reconfiguration block 720 can include or access circuitry to generate a known good configuration of client configurable logic 708, such as a zeroed-out/non-functional configuration. Reconfiguration block 720 can, in certain embodiments, configure client configurable logic 708 to provide certain known good functionality, such as a configuration useful for debugging of client configurable logic 708 or a logic device implementing client configurable logic 708. Reconfiguration block 720 may also change one or more aspects of a hardware logic device implementing client configurable logic 708, such as a clock speed. Reconfiguration block 720 may include memory or have access to memory (via a DMA engine, for example) to access configuration data to reconfigure the client configurable logic 708. In certain embodiments, reconfiguration block 720 may change a state of a reset input of a logic device that includes client configurable logic 708 or register(s) of the hardware device that cause the hardware device to erase or otherwise modify its configuration.

Isolation block 706 can also isolate client machine 730 upon determination that client machine 730 is responsible for an errant condition or isolating client machine 730 would otherwise mitigate an errant condition. Isolation can include preventing client machine 730 from access client configurable logic 708. For example, interface 734 may be disabled. For example, a PCI interface between client machine 730 and client configurable logic 708 may be disabled. In certain embodiments, isolation of client machine 730 can include preventing a corresponding client from access functionality of client machine 730. For example, the user's credentials may be revoked for access to client machine 730. In extreme conditions, if client machine 730 is a virtual machine, the virtual machine may be dissolved (e.g., a command may be sent to hypervisor/access control 732 to release resources provided to enable the client virtual machine and/or otherwise delete the client virtual machine from a host infrastructure system).

Configuration block 718 can include one or more registers that can be used to configure one or more aspects of monitoring block 702 and may be set by host privileged machine 630, for example. The values of the one or more registers can be used to change threshold values for detection block 704, certain response(s) to detected errant conditions, enable or disable monitoring for certain regions of a logic device or client machine 730, etc. Depending on values stored within the registers, differing responses may be configured to be enacted in response to detection of differing errant conditions. For example, a first (possibly less severe) errant condition may be configured to cause a response wherein a client virtual machine coupled to the client configurable logic 708 is notified of the condition. A second, (possibly more severe) errant condition may be configured to cause a response wherein the client configurable logic 708 is reconfigured. Any of the corrective actions disclosed herein can be assigned to the disclosed errant conditions in any order via use of configuration block 718. Configuration block 718 can include multiple tiered responses, as disclosed herein, wherein multiple errant conditions can be detected for a configuration of client configurable logic 708 and a respective corrective action chosen.

A configuration of client configurable logic 708 may become errant due to several conditions. The client configurable logic 708 may be configured to actively infiltrate or disrupt other clients' virtual machines or customer logic, the client configurable logic 708 may be incorrectly configured due to a mistake and become unresponsive, or a configuration of client configurable logic 708 may mistakenly attempt to access memory space or functionality of a cloud infrastructure system to which the configuration is not privileged to access.

If a configuration of client configurable logic 708 becomes non-responsive, then it may no longer responds to requests from a client virtual machine, for example. Detection block 704 can collect statistical information regarding a number of messages that the configuration of client configurable logic 708 has not responded to. If the configuration has not responded to a sufficient number of requests, then remediation block 716 may communicate to client machine 730 that the client configurable logic 708 is unresponsive and will be corrected. Correction, for this error mode, may take the form of isolating the client configurable logic 708 by severing interfaces to the client configurable logic 708 (via isolation block 706) and/or reloading the client configurable logic 708 to a known good or clear configuration via a configuration port (via reconfiguration block 720). Similarly, detection block 704 may monitor task completion indicators to determine if a configuration client configurable logic 708 has completed operations requested by a corresponding client virtual machine. In certain embodiments, remediation block 716 may, after determining that isolation block 706 has isolated corresponding client configurable logic 708, complete remaining data transfers or memory accesses. For example, a corresponding client machine may have requested data from client configurable logic 708 and/or request that data be transmitted to client configurable logic 708. Isolation block 706 may recognized a queued number of incomplete data or memory transfers and complete them via a DMA engine, for example, after client configurable logic 708 is isolated. Data transfers may also be completed between configurable logic 708 and other entities within a computer infrastructure system. Isolation of client configurable logic 708 may therefore retain certain input/output functionality between configurable logic 708 and a computer infrastructure system that includes configurable logic 708.

If a configuration of client configurable logic 708 malfunctions, then it may access areas of a cloud infrastructure to which it is not privileged, may overtax component(s) of the cloud infrastructure system, and/or attempt to interface with shell logic 712 outside of established protocol(s). In these instances, detection block 704 may monitor several different pieces of information. For example, detection block 704 may monitor transactions between configuration application logic 708 and shell logic 712 to determine if data transmitted from client configurable logic 708 abides by a defined interface protocol. If not, this may indicate that the configuration of client configurable logic 708 is errant. Isolation block 706 may, in response to detection block 704 determining an errant condition, isolate client configurable logic 708 or reconfiguration block 720 may reconfigure client configurable logic 708.

Detection block 704 may monitor traffic, temperature, and/or power usage of one or more components. For example, a DRAM controller or DMA engine of private peripheral interface(s) 714 may be monitored to determine if a configuration of client configurable logic 708 is exceeding its allocated bandwidth for the interface and/or is otherwise causing a peripheral interface to be overtaxed. Overtaxing can be determined by a temperature or power usage of the peripheral interface. Similarly a PCIe or other interface can be monitored. If such an errant condition is detected, then remediation block 716 may signal to client machine 730 that the corresponding client configurable logic 708 is exceeding its allocated bandwidth and/or overtaxing components, reconfiguration block 720 may reduce an operational frequency of or reconfigure client configurable logic 708, and/or isolation block 706 may isolate client configurable logic 708.

Detection block 704 may monitor address(es) and/or components accessed by client configurable logic 708. If a configuration of client configurable logic 708 actively or mistakenly attempts to access memory space that it is not privileged to access, configures a DMA engine or other device to access non-privileged memory space, and/or otherwise access a component of a cloud infrastructure system that the configuration of client configurable logic 708 is not privileged to access, then such an action can be detected by detection block 704 via interface logic 710. Isolation block 706 can, in response, isolate and/or reconfiguration block 720 may reconfigure client configurable logic 708.

Detection block 704 may also monitor data transmitted via interface 734 between client machine 730 and client configurable logic 708 to determine if client machine 730 is contributing to an errant condition. For example, client machine 730 may transmit data, via interface 734, that may be formatted incorrectly for reception or processing by client configurable logic 708. In such instance, reformat block 722 may be used to reform data transmitted between client machine 730 and client configurable logic 708. For example, a double word may be transmitted for populating register(s) of client configurable logic 708, but client configurable logic 708 or a hardware component used to implement client configurable logic 708 may be configured to access single words. If so, the data values of the double word may be separated into two separate single words and sequentially or otherwise be transmitted to client configurable logic 708.

If an errant condition is detected, reconfiguration block 720 can also reconfigure client machine 730. For example, client machine 730 can be a virtual machine and, if so, reconfiguration block 720 may request that hypervisor/access control 732 reinitializes client machine 730. The initialization may include utilizing different hardware component to host client machine 730. A different version of client machine 730 may also be requested to over write a determined errant version of client machine 730.

In certain embodiments, a response to a detected errant condition may be graduated. For example, a certain threshold number of messages that a configuration of client configurable logic 708 does not respond to, as detected by detection block 704, may trigger remediation block 716 to signal corresponding client machine 730 that the configuration of client configurable logic 708 may have issues. A second threshold number may trigger isolation block 706 to isolate and/or reconfiguration block 720 to reconfigure client configurable logic 708. As disclosed herein, if a logic or interface device is being overtaxed by a configuration of client configurable logic 708, then the configuration of client configurable logic 708 can be down-clocked by reconfiguration block 720 such that it operates at reduced speed and/or an interface to client configurable logic 708 may be down-clocked or otherwise limited.

Figure 8:
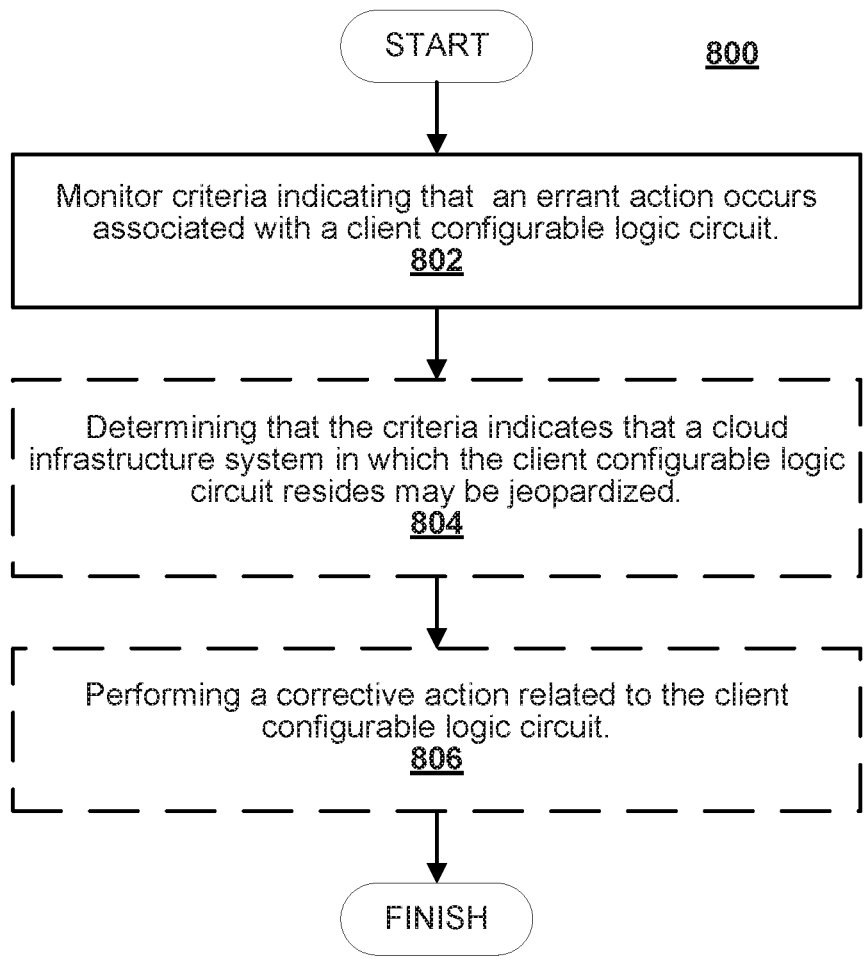
FIG. 8 illustrates an example flowchart implementing certain features of the monitoring block of FIG. 6.

FIG. 8 illustrates a flowchart 800 that can implement features of the disclosure. Flowchart 800 can be implemented by monitoring block 702, for example. At 802, criteria can be monitored and/or collected indicating that an errant action occurs that is associated with a client configurable logic circuit. The criteria can include a temperature value; a power consumption value; a statistical value indicative of data transferred between the shell logic circuit and the programmable logic hardware; a memory address accessed by the programmable logic hardware; a memory address accessed by a client machine coupled to the client configurable logic circuit, a format or protocol used to transmit data between the client configurable logic and a corresponding client machine, a timeout of a response to a command generated for of by the programmable logic hardware; or a statistical value indicative of data transferred across the hardware interface that was initiated by the programmable logic hardware. The monitoring and/or collection can be performed by detection block 704, for example.

At 804, the criteria can optionally be used to determine that a cloud infrastructure system in which the client configurable resides may be jeopardized by the errant action. Determining that a cloud infrastructure system in which the client configurable resides may be jeopardized can include determining that a value of the criteria meets a threshold. The determination can be performed by detection block 704 in conjunction with configuration block 718, for example. The errant action can jeopardize the cloud infrastructure system by, for example, being an action that may damage programmable logic hardware of the client configurable logic circuit, interfere with data communications via a hardware interface coupled to the client configurable logic circuit, damaging the shell logic, accessing computer resources residing outside of a client domain on which the client configurable logic circuit resides, or otherwise contribute to a fault of the cloud infrastructure system. At 806, a corrective action can optionally be performed on the client configurable logic circuit or a client machine coupled to the client configurable logic circuit. Corrective actions can include isolating input/output paths to or from the client configurable logic circuit, reconfiguring the client configurable logic circuit, isolating the client configurable logic circuit or a corresponding client machine, reformatting data transferred to or from client configurable logic 708, or altering operation of the client configurable logic circuit (such as by changing a clock rate at which the client configurable logic circuit operates) or the corresponding client machine. The corrective action can be performed by isolation block 706, reconfiguration block 720, reformat block 722, or remediation block 716.

Figure 9:
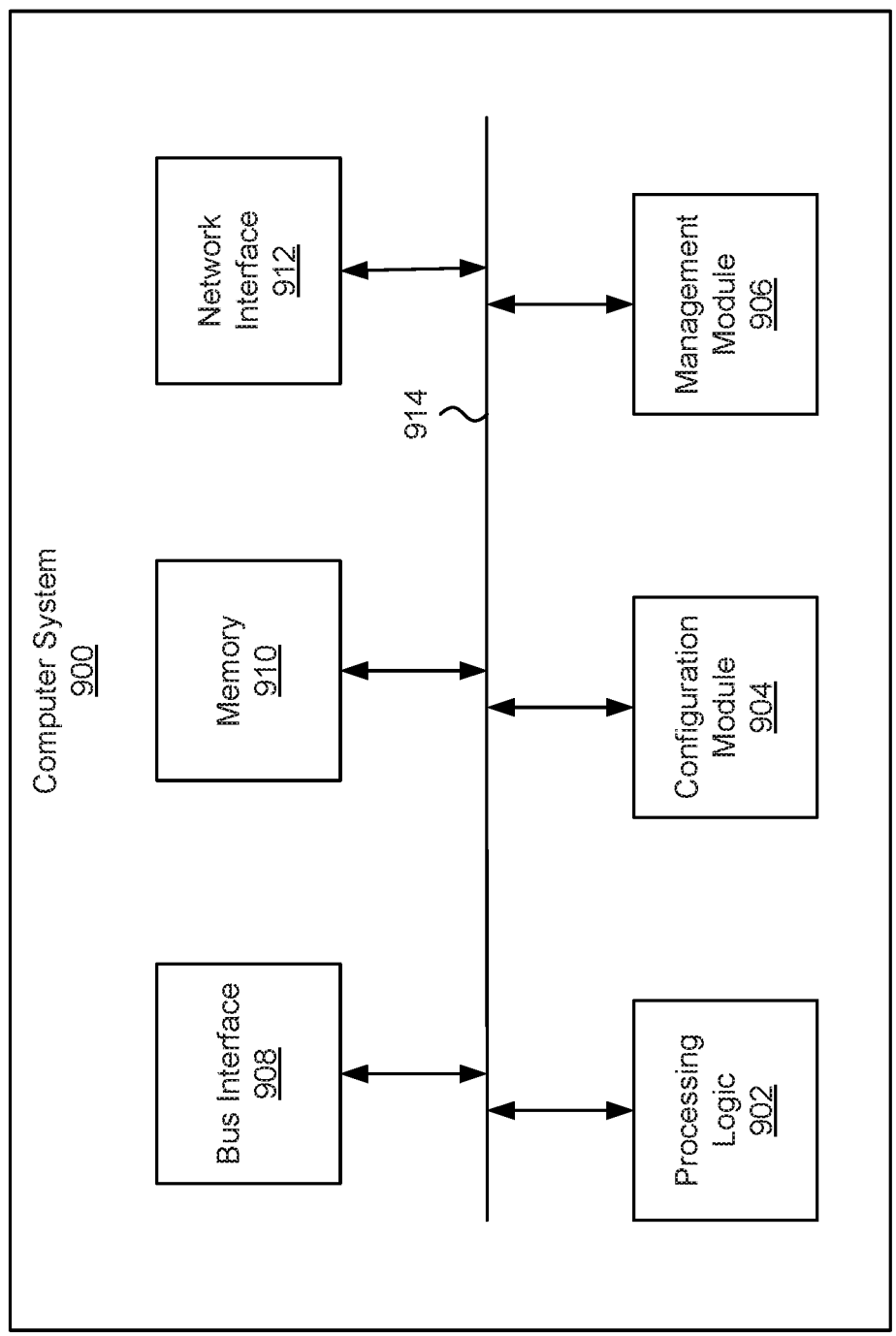
FIG. 9 illustrates an example environment of a computer system for implementing aspects in accordance with some embodiments.

FIG. 9 illustrates an example of a computer system 900. Functionality and/or several components of the computer system 900 may be used without limitation with other features disclosed elsewhere in this disclosure, without limitations. A computer system 900 may facilitate processing of packets and/or forwarding of packets from the computer system 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer system 900 may be the recipient and/or generator of packets.

In some implementations, the computer system 900 may modify the contents of the packet before forwarding the packet to another device. The computer system 900 may be a peripheral device coupled to another computer device, a switch, a router or any other suitable device enabled for receiving and forwarding packets.

In one example, the computer system 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computer system 900 may include additional modules, not illustrated here, such as components discussed with respect to the nodes disclosed in FIG. 9. In some implementations, the computer system 900 may include fewer modules. In some implementations, one or more of the modules may be combined into one module. One or more of the modules may be in communication with each other over a communication channel 910. The communication channel 910 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computer system 900, while in other cases some or all of the memory may be external to the computer system 900. The memory 910 may store an operating system comprising executable instructions that, when executed by the processing logic 902, provides the execution environment for executing instructions providing networking functionality for the computer system 900. The memory may also store and maintain several data structures and routing tables for facilitating the functionality of the computer system 900.

In some implementations, the configuration module 904 may include one or more configuration registers. Configuration registers may control the operations of the computer system 900. In some implementations, one or more bits in the configuration register can represent certain capabilities of the computer system 900. Configuration registers may be programmed by instructions executing in the processing logic 902, and/or by an external entity, such as a host device, an operating system executing on a host device, and/or a remote device. The configuration module 904 may further include hardware and/or software that control the operations of the computer system 900.

In some implementations, the management module 906 may be configured to manage different components of the computer system 900. In some cases, the management module 906 may configure one or more bits in one or more configuration registers at power up, to enable or disable certain capabilities of the computer system 900. In certain implementations, the management module 904 may use processing resources from the processing logic 902. In other implementations, the management module 906 may have processing logic similar to the processing logic 902, but segmented away or implemented on a different power domain than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computer system 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.9 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 900 may include multiple network interface modules, each configured to communicate with a different network. For example, in these implementations, the computer system 900 may include a network interface module for communicating with a wired Ethernet network, a wireless 802.11 network, a cellular network, an Infiniband network, etc.

The various components and modules of the computer system 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 10:
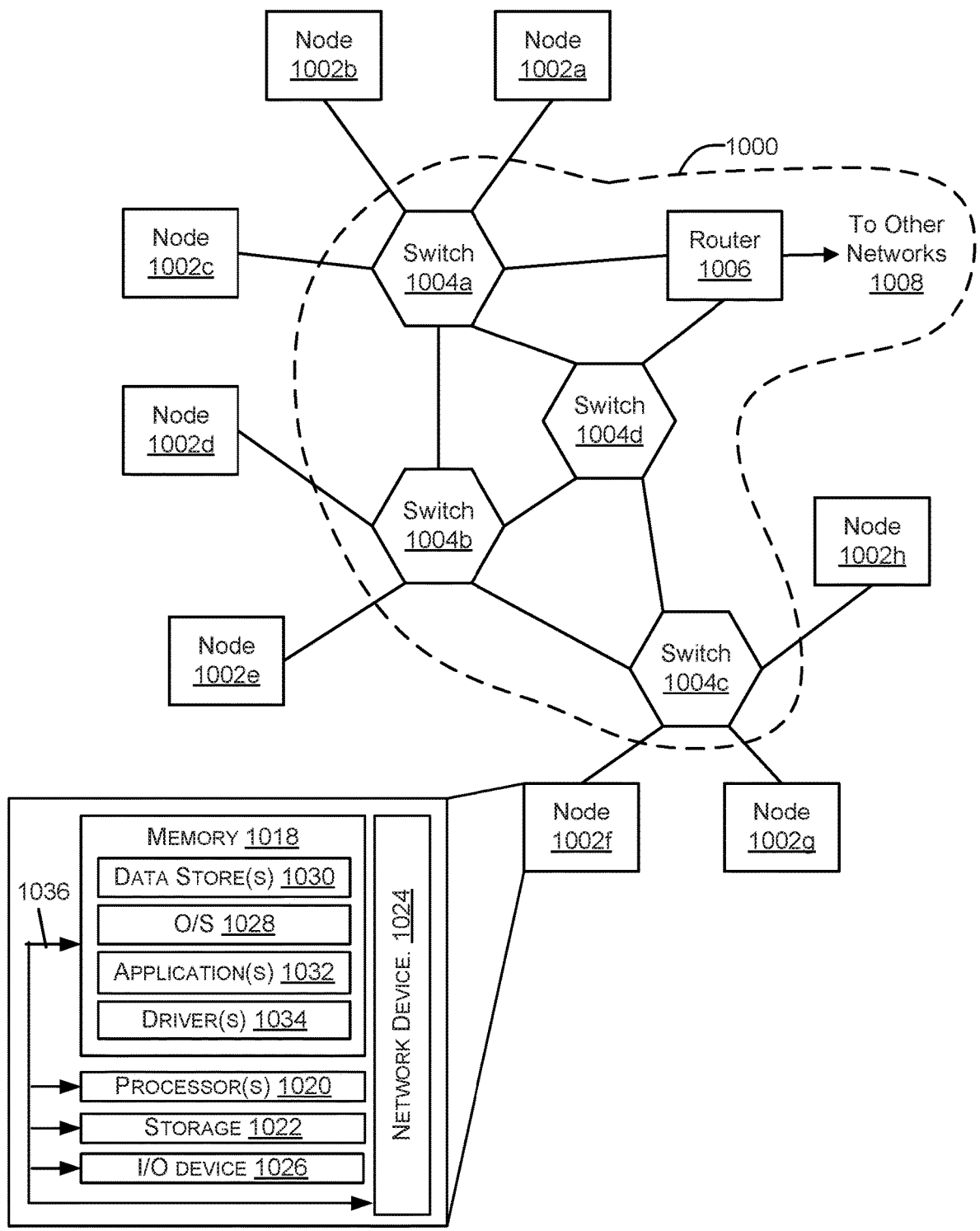
FIG. 10 illustrates an example architecture for features and systems described herein that includes one or more service provider computers and/or a user device connected via one or more networks, according to some embodiments.

FIG. 10 illustrates a network 1000, illustrating various different types of network devices computer system 900 of FIG. 9, such as nodes comprising the network device, switches and routers. In certain embodiments, the network 1000 may be based on a switched architecture with point-to-point links. As illustrated in FIG. 10, the network 1000 includes a plurality of switches 1004a-1004d, which may be arranged in a network. In some cases, the switches are arranged in a multi-layered network, such as a Clos network. A computer system 900 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more network devices for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices 1004. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1026 that allow the node(s) 1002a-1002h to communicate with a stored database, another computing device or server, user terminals and/or other devices on the network(s) 1000. The network device(s) 1024 of FIG. 10 may include similar components discussed with reference to the computer system 900 of FIG. 9.

In some implementations, the network device 1026 is a peripheral device, such as a PCI-based device. In these implementations, the network device 1026 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1026 may be connected to a computing system using a PCIe interface.

A PCI-based device may include one or more functions. A "function" describes operations that may be provided by the network device 1026. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1026 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   internetworked computer devices organized into domains, wherein the domains include a client domain and a host domain having a higher priority level than the client domain; and
   wherein one of the computer devices includes:
   a client configurable logic circuit comprising first programmable logic hardware included in the client domain, the first programmable logic hardware configured according to client configuration data provided by a virtual machine within the client domain;
   a shell logic circuit comprising second programmable logic hardware, the shell logic circuit included in the host domain, wherein the shell logic circuit encapsulates the client configurable logic circuit; and
   a monitoring circuit coupled to the shell logic circuit, wherein the monitoring circuit is included within the host domain and the monitoring circuit is configured to:
   determine that an errant action associated with the client configurable logic circuit occurs, wherein the errant action is capable of interfering with an operation of one of the internetworked computer devices or damaging one of the internetworked computer devices; and
   isolate the client configurable logic circuit from the virtual machine in response to determining that the errant action occurs.

2. The system of claim 1, wherein the determining that an errant action occurs includes monitoring criteria including:
a temperature value;
a power consumption value;
a statistical value indicative of data transferred between the shell logic circuit and the client configurable logic circuit;
a memory address accessed by the first programmable logic hardware;
a timeout of a response to a command generated for the first programmable logic hardware; or
a statistical value indicative of data transferred to or from the client configurable logic circuit.

3. The system of claim 1, wherein the client configurable logic circuit, the shell logic circuit and the monitoring circuit reside on a same programmable logic device comprising the first programmable logic hardware and the second programmable logic hardware.

4. The system of claim 1, wherein the monitoring circuit includes third programmable logic hardware.

5. The system of claim 1, wherein the monitoring circuit is configured to isolate the client configurable logic circuit based on at least one of: physically separating the client configurable logic circuit from the shell logic circuit, disabling a hardware interface between the virtual machine and the client configurable logic circuit, or modifying a clock rate the client configurable logic circuit operates at the first programmable logic hardware.

6. The system of claim 1, wherein a configuration interface to receive configuration data for configuring the first programmable logic hardware remains accessible to the first programmable logic hardware when the client configurable logic circuit is isolated.

7. The system of claim 1, wherein the errant action is caused by an operation of the first programmable logic hardware configured according to the client configuration data.

8. The system of claim 1, wherein the errant action occurs in the first programmable logic hardware configured according to the client configuration data.

9. A system, comprising:
a client configurable logic circuit, wherein the client configurable logic circuit comprises programmable logic hardware that is configured according to client configuration data and that resides within a client domain;
a hardware interface communicatively coupled with a virtual machine;
a shell logic circuit coupled to the client configurable logic circuit and the hardware interface, the shell logic circuit residing in a host domain and being configured to control access of the programmable logic hardware to the hardware interface;
a monitoring circuit coupled to the client configurable logic circuit, the monitoring circuit residing in the host domain and being configured to:
detect an errant action of the client configurable logic circuit; and
prevent the client configurable logic circuit from communicating with the virtual machine via the hardware interface in response to detecting the errant action, and
a hypervisor configured to manage interactions between the host domain and the client domain.

10. The system of claim 9, wherein the errant action includes an action capable of: damaging the programmable logic hardware, interfering with data communications via the hardware interface, damaging the shell logic circuit, causing the system to fail, accessing computer resources not accessible to the client configurable logic circuit, or otherwise inducing a fault in the system.

11. The system of claim 9, wherein the virtual machine comprises a host virtual machine residing in the host domain, and wherein the host virtual machine is configured to communicate with the shell logic circuit.

12. The system of claim 11, wherein the hardware interface is communicatively coupled with a guest virtual machine residing in the client domain and executing on a client device, the guest virtual machine configured to communicate with the programmable logic hardware.

13. The system of claim 9, wherein the monitoring circuit is part of the shell logic circuit.

14. The system of claim 9, wherein the monitoring circuit includes:
a first set of registers configured to accumulate one or more values corresponding to pre-determined criteria;
a second set of registers configured to store a threshold value; and
circuitry configured to:
determine that one of the first set of registers meets a corresponding threshold value of the second set of registers, and
in response to determining that the one of the first set of registers meets the corresponding threshold value of the second set of registers, perform a corrective action.

15. The system of claim 14, wherein the corrective action comprises isolating a client virtual machine coupled to the programmable logic hardware from the programmable logic hardware and completing a pending memory access request or a pending data transfer after the client virtual machine has been isolated.

16. The system of claim 15, wherein the corrective action includes at least one of:
severing input/output functionality of the programmable logic hardware;
transmitting a message to the client virtual machine coupled to the programmable logic hardware;
isolating the client virtual machine coupled to the programmable logic hardware from the programmable logic hardware;
throttling communications between the client virtual machine coupled to the programmable logic hardware and the programmable logic hardware;
deleting the client virtual machine coupled to the programmable logic hardware;
reformatting data transferred to or from the programmable logic hardware by the client virtual machine coupled to the programmable logic hardware;
reconfiguring the programmable logic hardware; or
altering a functionality of a hardware device used to implement the programmable logic hardware.

17. A method, comprising:
collecting, by a monitoring logic circuit that resides in a host domain, values of criteria corresponding to a client configurable logic circuit, wherein the client configurable logic circuit includes programmable logic hardware configured according to client configuration data and resides in a client domain, interactions between the host domain and the client domain being managed by a hypervisor;
determining that the values meet a threshold;
in response to determining that the values meet the threshold:

determining that the programmable logic hardware has performed an errant action; and in response to determining that the programmable logic hardware has performed the errant action, isolating the client configurable logic circuit from a virtual machine.

18. The method of claim 17, wherein the values of criteria corresponding to the client configurable logic circuit are collected from a sensor coupled to a physical component, the physical component coupled to the client configurable logic circuit.

19. The method of claim 17, comprising:

configuring the programmable logic hardware according to a first set of client configuration data;

configuring the programmable logic hardware according to a second set of client configuration data; and wherein the programmable logic hardware is included in a first domain when configured according to the first set of client configuration data and the programmable logic hardware is included in a second domain when configured according to the second set of client configuration data.

20. The method of claim 17, comprising:

configuring a first region of the programmable logic hardware according to a first set of client configuration data;

configuring a second region of the programmable logic hardware according to a second set of client configuration data; and wherein the first region of the programmable logic hardware is included in a first domain and the second region of the programmable logic hardware is included in a second domain.

21. The method of claim 17, further comprising: encapsulating or repackaging data transmitted to or from the programmable logic hardware via a hardware interface.

22. The method of claim 17, comprising:

determining that the values meet a first threshold or a second threshold;

in response to determining that the values meet the first threshold, determining that the programmable logic hardware has performed a first errant action; and in response to determining that the values meet the second threshold, determining that the programmable logic hardware has performed a second errant action.

* * * * *